United States Patent [19]
Laney et al.

[11] Patent Number: 5,467,134
[45] Date of Patent: Nov. 14, 1995

[54] METHOD AND SYSTEM FOR COMPRESSING VIDEO DATA

[75] Inventors: Stuart T. Laney, Seattle; Eric Ledoux, Redmond; David M. Maymudes, Seattle; Daniel J. Miller, Redmond, all of Wash.

[73] Assignee: Microsoft Corporation, Redmond, Wash.

[21] Appl. No.: 995,504

[22] Filed: Dec. 22, 1992

[51] Int. Cl.$^6$ .................................................. H04N 7/26
[52] U.S. Cl. ...................... 348/409; 348/415; 348/417; 348/418; 348/420; 348/422
[58] Field of Search ........................... 348/420, 422, 348/409, 415, 417, 418; H04N 7/130

[56] References Cited

U.S. PATENT DOCUMENTS

| | | | |
|---|---|---|---|
| 3,524,926 | 8/1970 | Starr | 375/28 |
| 4,897,717 | 1/1990 | Hamilton | 348/422 |
| 4,958,225 | 9/1990 | Bi | 348/422 |
| 5,136,374 | 8/1992 | Jayant | 348/422 |
| 5,235,418 | 8/1993 | Lucas | 348/422 |
| 5,272,529 | 12/1993 | Frederiksen | 348/422 |
| 5,283,656 | 2/1994 | Sugahara | 348/420 |

*Primary Examiner*—Howard W. Britton
*Attorney, Agent, or Firm*—Seed and Berry

[57] ABSTRACT

A method for compressing video movie data to a specified target size using intraframe and interframe compression schemes. In intraframe compression, a frame of the movie is compressed by comparing adjacent pixels within the same frame. In contrast, interframe compression compresses by comparing similarly situated pixels of adjacent frames. The method begins by compressing the first frame of the video movie using intraframe compression. The first stage of the intraframe compression process does not degrade the quality of the original data, e.g., the method uses run length encoding based on the pixels' color values to compress the video data. However, in circumstances where lossless compression is not sufficient, the method utilizes a threshold value, or tolerance, to achieve further compression. In these cases, if the color variance between pixels is less than or equal to the tolerance, the method will encode the two pixels using a single color value—otherwise, the method will encode the two pixels using different color values. The method increases or decreases the tolerance to achieve compression within the target range. In cases where compression within the target range results in an image of unacceptable quality, the method will split the raw data in half and compress each portion of data separately. Frames after the first frame are generally compressed using a combination of intraframe and interframe compression. Additionally, the method periodically encodes frames using intraframe compression only in order to enhance random frame access.

74 Claims, 14 Drawing Sheets

| First Byte | Second Byte | Third Byte | Fourth Byte | Meaning/ Explanation |
|---|---|---|---|---|
| 0 | 0 | Not Applicable | Not Applicable | End of Line |
| 0 | 1 | Not Applicable | Not Applicable | End of Bitmap |
| 0 | 2 | Horizontal Offset (0-255) | Vertical Offset (0-255) | Delta; Escape Sequence 00, 02 Represents a Delta, the Two Bytes that Follow Represent Horizontal and Vertical Positioning Information; Used Only for Deltas Having a Non-Zero Vertical Offset or a Horizontal Offset Greater than 14 |
| 1-14 | Not Applicable | Not Applicable | Not Applicable | Horizontal Delta of Magnitude Less than 15 Pixels |
| Length of Run (15-255) | Color Index (0-255) | Not Applicable | Not Applicable | Run Length Encoding; the First Byte Represents the Length of the Run (the Invention Obtains the Actual Length by Subtracting 14 from the Encoding Value); the Second Byte is the Run's Color Index |
| 0 | # of Absolutely Encoded Pixels (3-255) | Color Index (0-255) | Not Applicable | Absolute Encoding; the First Byte, 00, is an Escape Code; the Second Byte, Ranging From 3-255, Represents the Number of Bytes that Follow, Each of Which Contains the Color Index of a Single Pixel |

| First Byte | Second Byte | Third Byte | Fourth Byte | Meaning/Explanation |
|---|---|---|---|---|
| 0 | 0 | Not Applicable | Not Applicable | End of Line |
| 0 | 1 | Not Applicable | Not Applicable | End of Bitmap |
| 0 | 2 | Horizontal Offset (0-255) | Vertical Offset (0-255) | Delta; Escape Sequence 00, 02 Represents a Delta, the Two Bytes that Follow Represent Horizontal and Vertical Positioning Information |
| Length of Run (1-255) | Color Index (0-255) | Not Applicable | Not Applicable | Run Length Encoding; the First Byte is the Length of the Run and the Second Byte is the Run's Color Index |
| 0 | # of Absolutely Encoded Pixels (3-255) | Color Index (0-255) | Not Applicable | Absolute Encoding: the First Byte, 00, is an Escape Code; the Second Byte, Ranging From 3-255, Represents the Number of Bytes that Follow, Each of Which Contains the Color Index of a Single Pixel |

Figure 9
*(Prior Art)*

| Color Index \ RGB Values | R | G | B |
|---|---|---|---|
| 40 | 235 | 20 | 20 |
| 41 | 84 | 84 | 84 |
| 42 | 168 | 168 | 168 |
| 43 | 255 | 0 | 0 |
| 44 | 255 | 255 | 255 |
| 45 | 240 | 10 | 10 |
| 46 | 235 | 120 | 120 |
| 47 | 84 | 90 | 94 |
| 48 | 178 | 168 | 168 |
| 49 | 143 | 143 | 143 |
| 50 | 153 | 153 | 153 |

*Figure 10*

| First Byte | Second Byte | Third Byte | Fourth Byte | Meaning/Explanation |
|---|---|---|---|---|
| 0 | 0 | Not Applicable | Not Applicable | End of Line |
| 0 | 1 | Not Applicable | Not Applicable | End of Bitmap |
| 0 | 2 | Horizontal Offset (0-255) | Vertical Offset (0-255) | Delta; Escape Sequence 00, 02 Represents a Delta, the Two Bytes that Follow Represent Horizontal and Vertical Positioning Information; Used Only for Deltas Having a Non-Zero Vertical Offset or a Horizontal Offset Greater than 14 |
| 1-14 | Not Applicable | Not Applicable | Not Applicable | Horizontal Delta of Magnitude Less than 15 Pixels |
| Length of Run (15-255) | Color Index (0-255) | Not Applicable | Not Applicable | Run Length Encoding; the First Byte Represents the Length of the Run (the Invention Obtains the Actual Length by Subtracting 14 from the Encoding Value); the Second Byte is the Run's Color Index |
| 0 | # of Absolutely Encoded Pixels (3-255) | Color Index (0-255) | Not Applicable | Absolute Encoding; the First Byte, 00, is an Escape Code; the Second Byte, Ranging From 3-255, Represents the Number of Bytes that Follow, Each of Which Contains the Color Index of a Single Pixel |

*Figure 14*

METHOD AND SYSTEM FOR COMPRESSING VIDEO DATA

TECHNICAL FIELD

This invention relates to data compression and decompression, and, more particularly, a method and system for encoding video data to a specified target range for the size of the compressed image.

BACKGROUND OF THE INVENTION

The advent of multimedia personal computers (MPCs) is likely to revolutionize the home entertainment industry. Generally, an MPC consists of a powerful microprocessor, e.g., an Intel 386 microprocessor; a VGA monitor; a sound card; at least 2 megabytes of RAM; and a CD-ROM drive.

In order for an application program to completely realize the potential of an MPC, it must use these components to their fullest abilities. The desire to play a video movie on an MPC, while taking maximum advantage of the system's components, provided the impetus for the present invention.

In order to be aesthetically pleasing, video movies can be played at 15 frames per second. However, the standard CD-ROM drive can provide only 150K bytes of data per second. Therefore, a compression method, in order to produce a movie suitable for display on an MPC, must compress each frame of the movie to approximately 10K bytes: [(150K bytes/sec)/(15 frames/sec)=10K bytes/frame.]

However, developing a standard method which can consistently compress frames to this size—without losing substantial amounts of information—is a complicated procedure. The procedure is complicated for two fundamental reasons.

First, the size of the original raw data may vary substantially from movie to movie, e.g., a frame from a 320×240 pixel video movie might constitute 175K bytes of raw data while a frame from a 160×120 pixel video movie might constitute only 25K bytes of raw data.

Second, even within the same movie, some frames will be more difficult to compress than others. For example, a frame picturing a brightly colored meadow would inherently have more detail than a frame picturing a dimly lit street. Consequently, a compression method may not be able to encode the meadow frame to 10K bytes without unduly hampering the quality of the image.

The prior art teaches using a fixed compression rate to encode video movies for playback on an MPC. However, this approach is seriously flawed: A fixed rate of compression method will routinely either over-compress or under-compress the video data.

For example, a compression method that compresses raw data 20% of the raw data's original size would compress a raw data frame of 25K bytes to 5K bytes. Therefore, the prior art compression method would needlessly destroy 5K bytes of data. As a result, the compressed data, when expanded, yields a poor quality image.

On the other hand, the same compression method would compress a 175K byte frame of video data to only 35K bytes. In this case, the resulting compressed video data would be too large for use with an MPC.

Additionally, some prior art compression schemes encode the compressed data in a non-standard format. These prior art compression schemes are problematic because most MPC applications must translate the non-standard compressed data into a known format before the application can display the data on an MPC.

As a result, there has been a significant need for a method and system which can satisfactorily compress video, or other data, for playback at a given data rate.

SUMMARY OF THE INVENTION

A method for compressing frames of video data to a specified target size using both intraframe and interframe compression techniques. When using intraframe compression, the method compresses a frame of video data relative only to that data contained in the frame. On the other hand, when using interframe compression, the invention compresses a frame of video data relative to the frame of video data that immediately preceded the frame currently being compressed.

More specifically, regarding intraframe compression, the compression method begins by forming a plurality of pixel groupings from the pixels that constitute the frame of video data. Next, the invention calculates a variance value between two groupings based on a characteristic of the grouping, e.g., color intensity, etc. Once calculated, the invention compares the variance value to a specified intraframe tolerance. When the variance value is less than or equal to the intraframe tolerance the invention specifies a single value to represent the characteristic of both groupings. This calculation and comparison continues until the method has examined all groupings of the frame. The invention compresses the frame by counting the number of consecutive pixel groupings that have the same characteristic value. Once counted, the method stores the counted number and the characteristic value in a compressed version of the video frame.

Interframe compression operates in a similar manner. In this case, however, the method compares similarly situated pixel groupings of two consecutive frames. In this case, the invention counts the number of consecutive interframe pixel groupings that are within a specified interframe tolerance. Subsequently, the method encodes a delta to indicate this number of consecutive interframe pixel groupings. Additionally, the compression method may use a combination of both intraframe and interframe compression.

Regardless of the compression method used, the method compares the resulting compressed video frame to the specified target range. If the compressed video frame is not within the specified target range, the method adjusts one or both of the tolerances and recompresses the data in the manner previously described. Additionally, if the method cannot compress the video data to the specified target range without unduly hampering the quality of the video image, the method will divide the raw data video frame in half and compress each half separately.

BRIEF DESCRIPTION OF THE DRAWINGS

FIG. 9 is a chart illustrating a prior art encoding method used with the present invention.

FIG. 10 is a color lookup table used with the present invention.

FIG. 14 is a chart illustrating a novelencoding method used with the present invention.

DETAILED DESCRIPTION OF THE INVENTION

Figure 1:
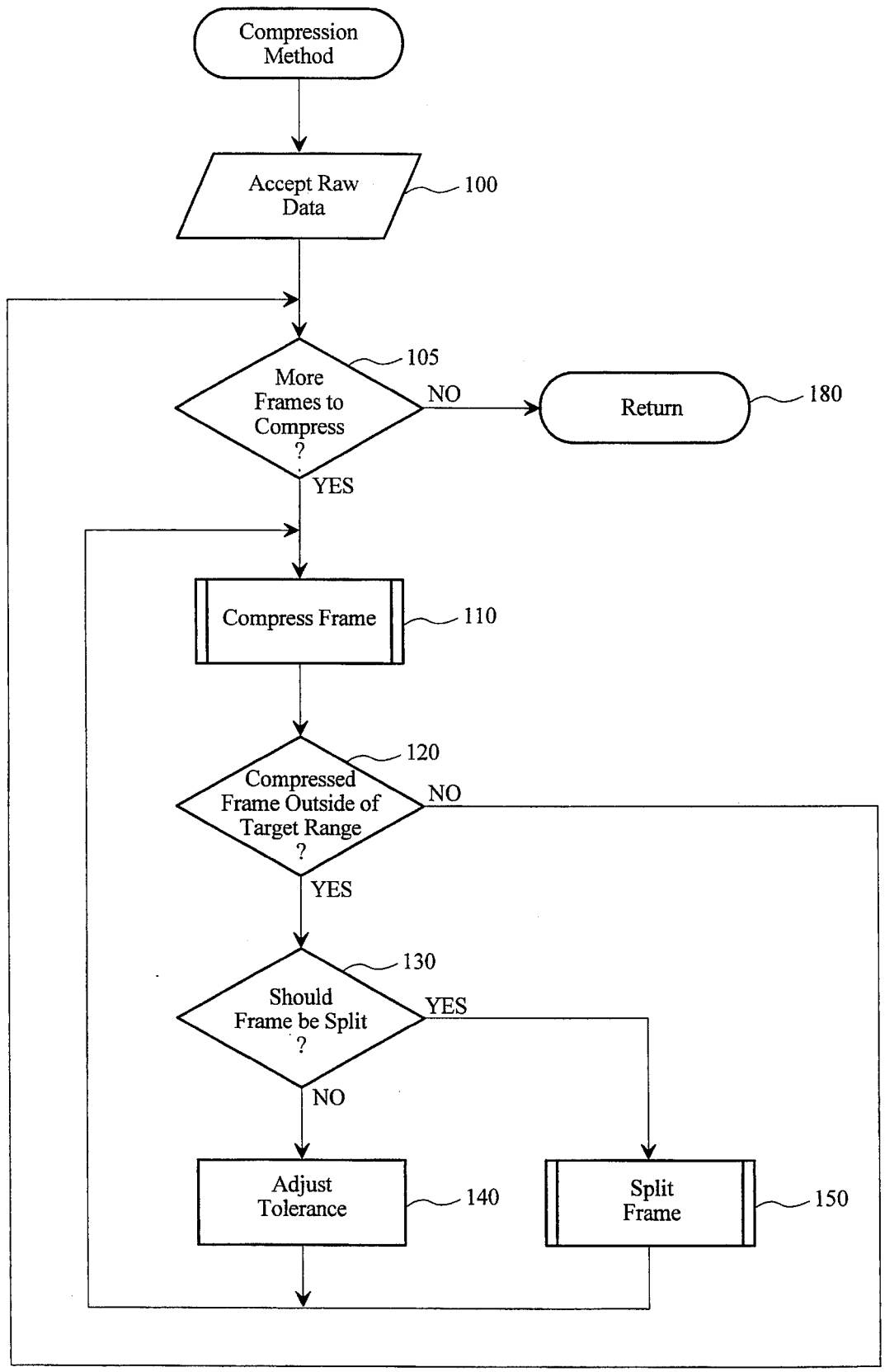
FIG. 1 is a flow diagram of the Compression Routine.

The present invention uses run length encoding and iterative tolerance values to compress video data within a target range. Essentially, the invention compresses video data by combining pixels having similar characteristics, e.g., having similar colors. First, the invention calculates a Variance Value based on the differences between pixels of a pixel pair. Second, the invention compares this Variance Value to a tolerance value. If the Variance Value is less than or equal to the tolerance value, the invention will describe both pixels with a single characteristic value, e.g., two consecutive light blue pixels adjacent to two consecutive very light blue pixels would be described as four consecutive light blue pixels.

In its present embodiment, the invention compresses frames of a video movie using either intraframe or interframe compression. When using intraframe compression, the invention compresses a frame using only the data contained in that particular frame.

On the other hand, when using interframe compression, the invention compresses a frame relative to an immediately preceding frame. For example, the invention compresses frame n+1 of a video movie by storing only those pixels that changed substantially from frame n. Since most frames of a movie, in order to create the illusion of movement, are similar to their surrounding frames, interframe compression can be a highly efficient encoding technique. On playback, the illusion of movement is maintained because the interframe encoded data of frame n+1 is displayed directly on top of frame n.

However, in order to maintain the illusion of movement, the invention must have a means of quickly accessing the pixels of frame n that must be updated to produce frame n+1. The invention satisfies this requirement by encoding a special byte grouping, known as a delta, in the compressed version of the frame.

Essentially, a delta directs the brush, the instrument used to colorize the pixels, to the pixels of frame n that need updating in order to produce frame n+1. The invention may encode deltas in a number of ways.

One delta encoding method uses a four-byte grouping to encode a delta. This method stores (1) a two-byte escape sequence, (2) a horizontal offset and (3) a vertical offset, in the compressed version of the frame. The two-byte escape sequence serves to identify the encoded bytes as a delta. The horizontal and vertical offsets simply describe the number of pixels that the decompression routine should move the brush before updating a pixel. See FIG. 9 (describing delta encoding process using horizontal and vertical offsets). This encoding technique, while effective in directing the brush to the appropriate pixel, sometimes does not make the most effective use of memory.

The majority of deltas occurring in compressed video data have vertical offsets of zero. Furthermore, the horizontal offsets of most deltas are relatively short, i.e., less than 16 pixels. In these situations, the invention may encode a delta as a single byte: the byte representing the magnitude of the horizontal offset. See FIG. 14 (describing delta encoding process using a single byte). The delta encoding method of FIG. 14, therefore, uses 75% less bytes than the delta encoding method of FIG. 9. Moreover, because deltas occur frequently in compressed video data, the 75% savings obtained in encoding each delta, translates into a 20% savings in the overall size of the compressed video data. However, regardless of which delta encoding method the invention invokes, interframe compression is a valuable compression tool.

Furthermore, by using interframe compression in combination with intraframe compression, the invention can create compressed frames of very high resolution. For example, if 70% of frame n+1 has not substantially changed from frame n, the invention will have approximately 10K of memory to store the remaining 30% of the video frame. Therefore, by using intraframe compression and a small tolerance value, the invention can store the remaining 30% of data with great detail.

In some cases, regardless of the amount of detail that could be gained using interframe compression, the invention encodes a frame using only intraframe compression. These frames are called key frames.

Key frames enhance a user's access to a random frame of a video movie. For example, if a user wanted to access a frame that occurred approximately 10 minutes into the video movie, the desired frame would have approximately 9,000 preceding frames. If the invention encoded all but the first frame using interframe compression, accessing frame 9,000 would require a tremendous amount of processing time, i.e., the invention would have to decode and display 9,000 frames before showing the desired frame.

To avoid this problem, the invention inserts key frames at regular intervals throughout the movie, e.g., once every 30 seconds. Therefore, to display a frame that occurs at a time slightly less than 10 minutes into the movie, the invention immediately indexes to the key frame compressed at 9½ minutes into the movie. By decompressing (1) the key frame and (2) all frames between the key frame and the desired frame, the invention can quickly display the viewer's specified frame.

Once an entire frame is compressed, the method compares the size of the compressed data to a target range. If the compressed data is larger than the upper limit of the target range, the invention either (1) increases the tolerance value, or (2) splits the video data into fractions. The invention then recompresses the data using the increased tolerance or the reduced amount of data. The invention repeats this recompression process until the compressed version of the data is within the target range.

On the other hand, if the compressed data is smaller than the target range, the invention decreases the tolerance and recompresses the frame. In this manner, the invention produces compressed video data that contains an optimum amount of information for a specified target range.

As shown in the drawings for purposes of illustration, the present invention is embodied in a method and system for compressing and decompressing a video movie. However, the compression and decompression techniques of the present invention may be used for compressing other types of data.

Generally, a video movie is formed by a plurality of video frames. In turn, each frame is formed by a plurality of pixels. Typically, every pixel has an associated characteristic value, e.g., color, intensity, etc. Additionally, a grouping of pixels may have an associated gray scale or a predominant color. The present invention anticipates compressing by comparing the characteristic values of individual pixels or groupings of pixels. For clarity, the illustrations of FIGS. 1–14 compress and decompress using the color values of individual pixels.

In most coloring schemes, the color of each pixel is represented by a number of individual color components. One popular set of color components is the RGB set, where R represents a red component, G represents a green component and B represents a blue component. Using the subscripts 2 to represent the components of one pixel and the subscripts 1 to represent the components of another pixel, the present embodiment of the invention calculates a Variance Value for a pixel pair using the following formula:

$$\text{Variance Value} = (R_2 - R_1)^2 + (G_2 - G_1)^2 + (B_2 - B_1)^2$$

From this point, the invention determines if the two pixels are similar in color for compression purposes using the following equation:

$$\text{Variance Value} \leq \text{Tolerance}$$

If the Variance Value satisfies the above equation, the invention will reference both pixels using a single color value. On the other hand, if the Variance Value is greater than the tolerance, the invention will reference each pixel of the pixel pair using two distinct color values.

In the illustrated embodiment, the invention compresses the video data by using the above comparison method for all consecutive pixel pairs in each line of the frame or frames. Additionally, the present embodiment uses different tolerance values for interframe compression and intraframe compression. These tolerances will be referred to as the Interframe Tolerance and the Intraframe Tolerance, respectively. The relationship between these two tolerances will be described in detail below. By either (1) adjusting the tolerances, or (2) splitting the raw data of the frame, the invention compresses raw video data within a specified target range.

COMPRESSION METHOD ROUTINE

A flow diagram for the routine that compresses the video movie is shown in FIG. 1. The compression process begins when block 100 accepts the frames of a video movie as raw data. In block 105, the routine determines if there is at least one frame of the movie that the routine has not yet compressed. If a remaining raw data frame exists, the routine calls the subroutine Compress Frame in block 110. In this manner, Block 110 produces a compressed version of the raw data frame. This compression process will be outlined in detail in reference to FIG. 2 below.

Block 120 examines the size of the compressed frame returned by the subroutine of block 110. If the compressed frame is not within the target range, the routine transfers control to block 130.

In turn, block 130 determines if the frame should be split. In the present embodiment, block 130 makes this determination by comparing the Interframe Tolerance to a Maximum Tolerance Value. If the Interframe Tolerance is greater than the Maximum Tolerance Value, block 130 turns processing control over to block 150. In turn, block 150, using the Split Frame Routine of FIG. 6, described below, splits the original raw data frame into two raw data frames and returns control to block 110.

On the other hand, if the Interframe Tolerance is less than the Maximum Tolerance Value, block 130 transfers control to block 140. In turn, block 140 either increases or decreases the Interframe tolerance using a modified binary search technique.

Generally, a binary search quickly locates an ideal value by repeatedly selecting a test value from the approximate midpoint of a narrowing range of possible values. Once the search method selects a test value, the search method determines if the selected value is greater or less than the ideal value.

If the selected value is greater than the ideal value, the search method selects a second test value. The search method selects the second test value from the midpoint of the range defined by the original minimum value of the range and the previously selected value.

Conversely, if the selected value is less than the ideal value, the search method selects a second test value from the midpoint of the range defined by the previously selected value and the original maximum value of the range.

By repeatedly selecting midpoint values from an ever-narrowing range of values, the binary search method can quickly determine an ideal value. However, the present invention has adapted the binary search method to make it ideally suited for video data compression. The invention uses this modified binary search method to determine a tolerance value that will produce a compressed version of the video frame within the target range.

The first modification the present invention makes is that the first test value the method selects is not at the midpoint of the entire permissible range of tolerance values. For example, using RGB color values, the permissible range of tolerance values is defined by the numbers between zero and 195,075 inclusive. ($255^2 + 255^2 + 255^2 = 195,075$). Therefore, one would suspect that the first selected tolerance would be 97,537.50: The midpoint between zero and 195,075. Theoretically, this is a valid assumption. However, for video data, the inventors heuristically determined that a tolerance of 2,000 and 250 were, respectively, more realistic first guesses at the ideal Interframe and Intraframe Tolerance values. Alternately, tolerances of 1,024 and 128 have been successfully used.

The second modification to the binary search method is the invention's determination of a subsequent guessed tolerance when the last guess was smaller than the ideal tolerance. Strict binary search theory would mandate that the subsequent guess be determined using the following relation:

Next Guess=(Previous Guess+Maximum Permissible Tolerance )/2

However, the Maximum Permissible Tolerance, 195,075, is, in practice, rarely used because it would unacceptably degrade the quality of the video data. As a result, using the Maximum Permissible Tolerance as a variable to determine the next guess would also produce tolerances that unacceptably degraded the video data. However, experimentation discerned that the following relationship sufficiently approximated a true binary search:

Next Interframe Tolerance Guess=Previous Interframe Tolerance Guess+$2^n$*(2048)

In the above formula, the value "n" is initially set to 0 and incremented on each subsequent calculation of a Next Interframe Tolerance Guess. For example, using this formula, the first three numbers to be added to the previous Interframe Tolerance Guess would be 2048, 4096 and 8,192.

By using the above relationship, the invention can quickly determine an Interframe Tolerance value that can be used to compress the video data within the target range.

Once the invention calculates a new Interframe Tolerance in this manner, the invention calculates a new Intraframe Tolerance. The invention calculates the new Intraframe Tolerance by using a heuristically determined relationship between an effective Interframe and an Intraframe Tolerance:

Intraframe Tolerance=(Interframe Tolerance)/8.

Therefore, the first three Intraframe Tolerance guesses are simply the first three Interframe Tolerance guesses divided by a factor of 8.

Block 140 adjusts the tolerances utilizing this modified binary search. Once block 140 adjusts the tolerances, it transfers control back to block 110 which re-compresses the frame.

The loop formed by blocks 110, 120, 130, 140 and 150 continues until block 120 recognizes that the compressed frame is within the target range. At this point, the routine returns control to block 105 which checks for another raw data frame. In this manner, the invention compresses all frames of the movie within the target range. Once the routine has compressed all the frames, it transfers control to block 180. In turn, block 180 returns to the application that called the inventive process.

COMPRESS FRAME ROUTINE

Figure 2:
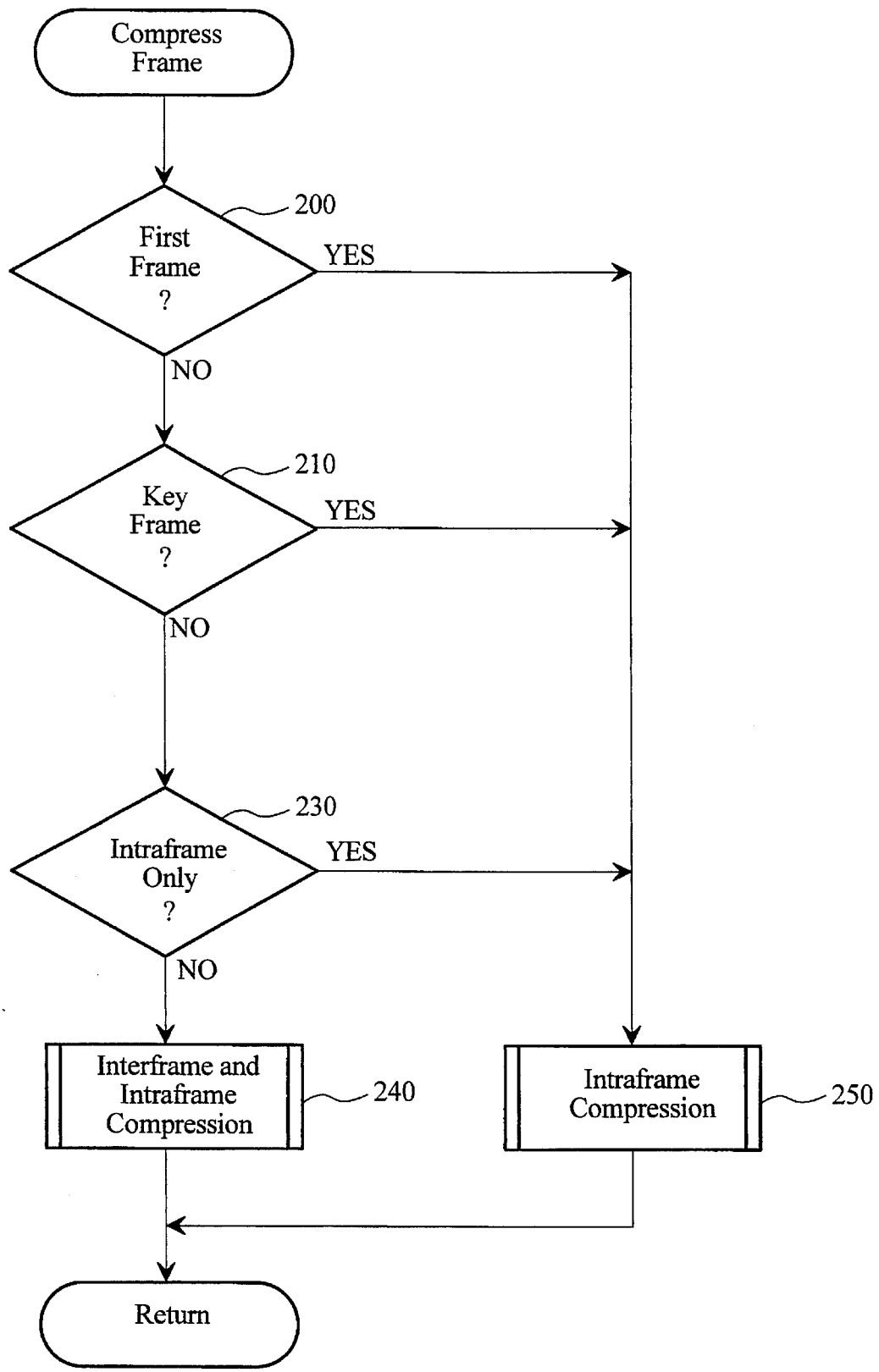
FIG. 2 is a flow diagram of the Compress Frame Routine of FIG. 1.

A flow diagram of the Compress Frame Routine, called by block 110 of FIG. 1, is shown in FIG. 2. The routine begins processing by making a series of tests to determine whether the routine should invoke interframe or intraframe compression.

First, block 200 tests to see if the routine is compressing the first frame of the movie. In this case, interframe compression is impossible: interframe compression requires two frames and here the invention only has a single frame to work with.

Block 210 tests to see if the routine should compress the frame as a key frame. For example, if the calling routine specifies that the invention should produce a key frame once every 150 frames, the routine would load a counter with the value of 150 and decrement the counter's value after every frame compression. When the routine decrements the counter to zero, it would set a flag indicating that the next frame should be compressed as a key frame. Subsequently, the routine would reload the counter with the value of 150. In this manner, the invention would produce key frames at the frequency, or key frame interval, specified by the calling program.

Finally, block 230 tests to see if interframe compression is the only type of compression available, e.g., the application calling the compression method may specify not to use any interframe compression—this may be the case where the data being compressed can routinely fit within the target range without resorting to interframe compression.

If any of the tests conducted in blocks 200, 210, or 230 is affirmative, the routine passes control to block 250. Block 250 then calls the subroutine Intraframe Compression, which will be described below. See FIG. 5 (flow diagram of intraframe compression routine). On the other hand, if all the tests conducted in blocks 200, 210 and 230 are negative, the routine directs control to block 240, which calls the subroutine Interframe Compression which will be described below. See FIGS. 3 and 4 (flow diagrams of interframe compression routine). After either block 240 or block 250 has compressed the frame, the routine directs control to block 260 which returns to block 110 of FIG. 1.

INTERFRAME AND INTRAFRAME COMPRESSION ROUTINE

Figure 3:
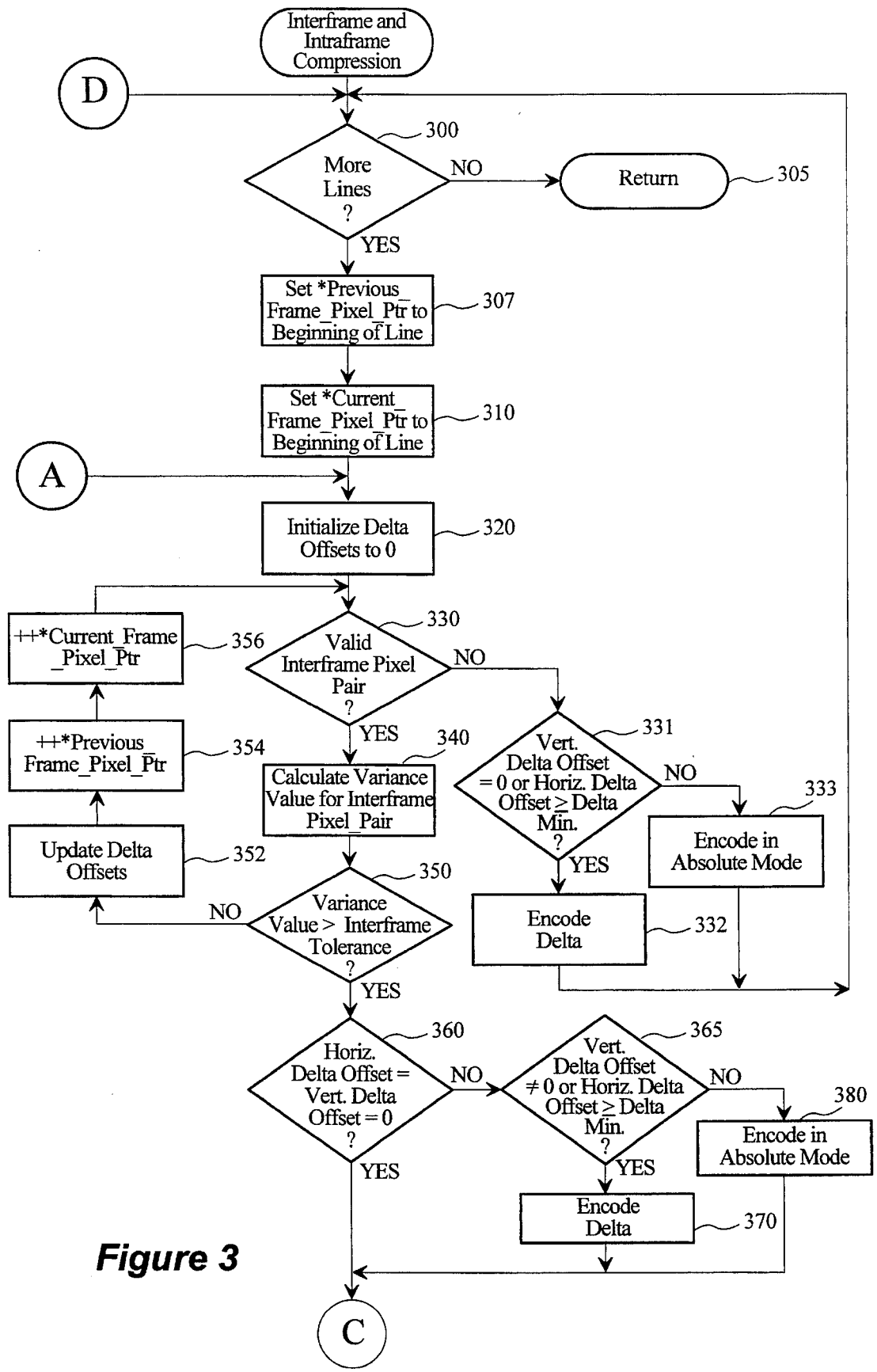
FIG. 3 is a flow diagram of the Interframe and Intraframe Compression Routine of FIG. 2.
Figure 4:
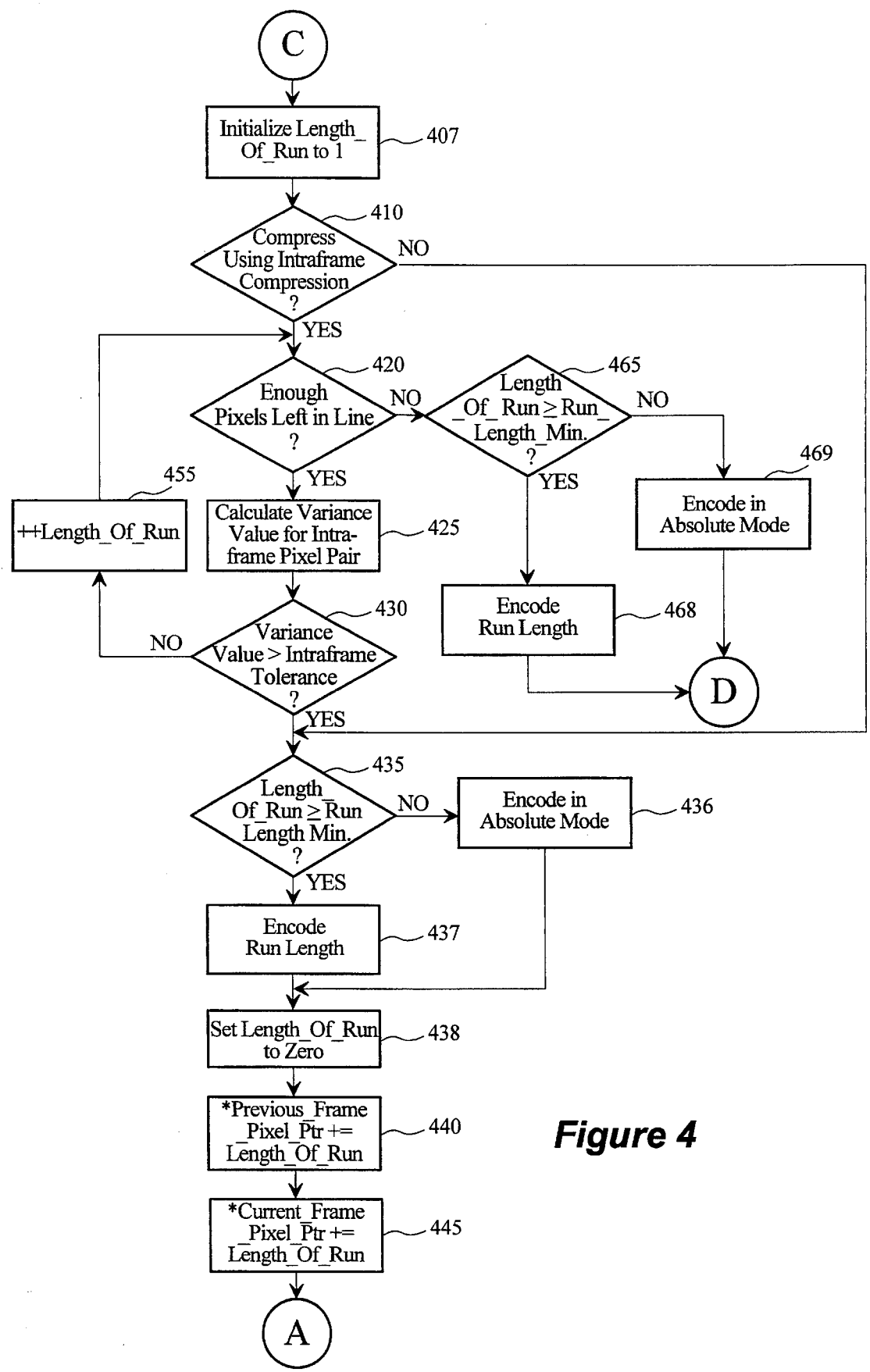
FIG. 4 is a continuation of FIG. 3.

A flow chart for the Interframe and Intraframe Compression routine is shown in FIGS. 3 and 4, See FIG. 2 at block 240 (calling the Interframe and Intraframe Compression Routine). As previously described, interframe compression encodes a frame of video data relative to an immediately preceding frame, e.g., by compressing the current frame, frame n+1, relative to the previous frame, frame n.

The Interframe and Intraframe Compression Routine uses two tolerances to compress frame n+1 relative to frame n: an Interframe Tolerance and an Intraframe Tolerance. The invention uses the Interframe Tolerance to determine whether the similarly situated pixels from two adjacent frames are close enough in color to be considered the same for compression purposes. Similarly, the invention uses the Intraframe Tolerance value to determine if two consecutive pixels of the same frame are close enough in color to be considered the same for compression purposes.

The Interframe and Intraframe Compression Routine begins compressing the current frame at block 300 of FIG. 3. Block 300 determines if there are remaining uncompressed lines of video data in the current frame. If the routine has compressed all lines of the current frame, block 300 transfers control to block 305 which returns to block 260 of FIG. 2.

On the other hand, if at least one uncompressed line of video data remains in the current frame, block 300 transfers control to block 307. In turn, block 307 sets the contents of a Previous Frame Pixel Pointer to the address of the first pixel in the next uncompressed line of the previous frame. Similarly, block 310 sets the contents of a Current Pixel Pointer to the address of the first pixel in the next uncompressed line of the current frame. Next, block 320 initializes the delta offsets to zero. At this point, block 330 tests to see if the pixels referenced by the contents of the Current and Previous Frame Pixel Pointers form a valid interframe pixel pair, i.e., has the end of the row of pixels been reached.

If the pair is valid, the routine calculates the pairs' Variance Value in block 340, e.g., by using the equation, variance value=$(R_2-R_1)^2+(G_2-G_1)^2+(B_2-B_1)^2$. The routine then compares the Variance Value to an Interframe Tolerance.

If the Interframe Tolerance is greater than or equal to the determined Variance Value, block 350 will transfer control to block 352. In turn, block 352, updates the delta offsets, e.g., block 352 may increment the horizontal offset (this process will be described in more detail in the following examples). After block 352 updates the delta offsets, it transfers control to block 354. Block 354 increments the contents of the Previous Frame Pixel Pointer and subsequently transfers control to block 356. Block 356 increments the contents of the Current Frame Pixel Pointer and transfers control to block 330. Block 330 again tests for another valid interframe pixel pair.

On the other hand, if block 350 determines that the Variance Value is greater than the Interframe Tolerance, block 350 transfers control to block 360. Block 360 examines the values of the delta offsets.

If both the horizontal and vertical delta offsets equal zero, block 360 transfers control to block 407 of FIG. 4. On the other hand, if at least one of the delta offsets is non-zero, block 360 of FIG. 3 transfers control to block 365. If both (1) the vertical delta offset is equal to zero and (2) the horizontal offset is less than a specified delta minimum, block 365 transfers control to block 380. In turn, block 380 encodes the pixels covered by the delta offsets in absolute mode. See FIG. 9 (describing absolute mode).

Essentially, absolute mode encodes pixels by using a two-byte escape sequence followed by the color indexes of the pixels. See FIG. 10 (color lookup table). In absolute mode, the first byte of the two-byte escape sequence is a zero. The second byte signifies the number of absolutely encoded pixels. Following these two bytes, each absolutely encoded pixel is represented by an index which describes the pixel's color. See FIG. 10 (color lookup table).

For example, referring to FIGS. 9 and 10, three pixels, each having the same RGB color values—(235, 20, 20), would be represented by the following byte grouping: [00 03 40 40 40]. As previously described, the first byte, (00), is an escape code. The second byte, (03), signifies that three bytes, describing the color values of three pixels, will follow this two-byte escape sequence. The following three bytes, (40, 40, and 40), describe the color index for the pixels. See FIG. 10 (color lookup table). Using this scheme, block 380 of FIG. 3 encodes the pixels if both (1) the vertical delta offset equals zero and (2) the horizontal offset is less than a specified delta minimum.

On the other hand, if either (1) the vertical delta offset is non-zero or (2) the horizontal offset is greater than the specified delta minimum, block 365 transfers control to block 370. The horizontal offset is tested against the specified delta minimum for efficient encoding: The method uses two bytes to encode the escape sequence for absolute encoding, see FIG. 9, and either one or four bytes to encode a delta. See FIGS. 9 and 14. Therefore, encoding deltas for small jumps is not cost efficient.

As an example of this inefficiency, consider the effect of encoding a delta for a jump of only two pixels. Such an encoding could cost up to four bytes: The two byte delta escape sequence and the two bytes to restart the absolute encoding.

To illustrate this example, assume that the delta encoding would jump over two pixels having color indexes of 44 flanked on either side by three pixels having color indexes of 40. Using the encoding technique of FIG. 9, encoding a delta in this situation would require 14 bytes: [00 03 40 40 40] [00 02 02 00] [00 03 40 40 40]. The first byte grouping, bracketed for clarity, is an absolute encoding of three pixels each having a color index of 40. The second byte grouping is a delta having a horizontal offset of two and a vertical offset of zero See FIG. 9. The last byte grouping is another absolute encoding of three pixels each having a color index of 40.

Alternatively, the encoding technique of FIG. 14, using single byte encoding for purely horizontal deltas, is more efficient, but would still require 11 bytes: [00 03 40 40 40] [02] [00 03 40 40 40]. In this encoding, the first and third byte groupings are identical to those described previously. The middle byte grouping, the single byte delta, saves three bytes over the method of FIG. 9. This savings, however, does not justify encoding the delta.

By not encoding the delta, the invention can save four bytes relative to the method of FIG. 9 and one byte relative to the method of FIG. 14. Straight absolute encoding of this sequence requires only 10 bytes: [00 08 40 40 40 44 44 40 40 40]. For the reasons exemplified by the preceding example, the present embodiment of the invention does not encode deltas for horizontal jumps less than four pixels in length. However, block 370 of FIG. 3 does encode deltas, pursuant to the scheme set forth in either FIG. 9 or FIG. 14, for jumps larger than the delta minimum. Once the routine has encoded the pixel information, either by block 370 or block 380 of FIG. 3, the routine passes control to block 407 of FIG. 4. As previously mentioned, if all delta offsets are zero, block 360 will directly transfer control to block 407 of FIG. 4.

Block 407 initializes a Length of Run variable to 1. The routine uses the Length of Run variable to count the number of consecutive pixels in the video data whose colors do not exceed the Intraframe Tolerance. Next, block 410 determines if the routine may compress the frame using intraframe compression. If intraframe compression is valid, the routine passes control to block 420.

Block 420 makes compression decisions based on the current value of the Length of Run variable and the number of non-compressed pixels left in the line.

The Run Length Minimum is a threshold value that the routine uses to determine whether it is efficient to encode a string of pixels in a run length, as opposed to in absolute mode. For values less than or equal to the Run Length Minimum, it is not cost effective to break from absolute mode encoding to run length encoding. Therefore, small run lengths are encoded using the previously described absolute mode method. See FIGS. 9 and 14 (describing absolute mode encoding) and above discussion of Delta Minimum (equivalent efficiency rationale). Alternatively, for run lengths greater than the Run Length Minimum, it is cost effective to encode the pixels referenced by the Length of Run variable as a run length encoding. If block 420 of FIG. 4 determines that either (1) the number of pixels left in the line plus the value of the Length of Run variable is less than or equal to the Run Length Minimum or (2) the number of pixels left in the line equals zero, the routine transfers control to block 465. Block 465 evaluates the magnitude of the Length of Run variable.

If the Length of Run variable is greater than, or equal to, the Run Length Minimum, block 465 passes control to block 468 which encodes the pixels as a run length encoding. See FIGS. 9 and 14 (describing run length encoding). Block 468 may encode this Run Length in a number of ways.

One method of encoding a run length is illustrated in FIG. 9. In this method, two bytes are used to denote a run length encoding. The first byte, having a range of possible values from 1 to 255, signifies the magnitude of the length of run. The second byte, having a range of possible values from 0 to 255, represents the color index of the pixel. See FIG. 10 (color lookup table).

An alternative run length encoding technique is illustrated in FIG. 14. The technique of FIG. 14 is similar to that of FIG. 9 in that two bytes describe the run length. In the second technique, however, the first byte has a range of only 15 to 255. This limitation of range is necessary because, as previously described, the values 1–14 are reserved to encode horizontal deltas. Using the method of FIG. 14, the magnitude of the run length is obtained by subtracting 14 from the first byte of the run length encoding. The second byte of the run length encoding represents the pixel's color index in a manner identical to that previously described in reference to FIG. 9.

For purposes of illustration, consider the case where the Length of Run variable has a value of five and the Current Frame Pixel Pointer is referencing a pixel having RGB values of (255, 0, 0). According to the color lookup table of FIG. 10, these RGB values are represented by the color index of 43. See FIG. 10 (color lookup table).

Therefore, the encoding method of FIG. 9 would encode the run length as the byte grouping [05 43]: The first byte, (05), being the magnitude of the run length and the second byte, (43) being the color index for the pixels.

Similarly, the encoding method of FIG. 14 would encode the run length as the byte grouping [19 43]: The first byte, (19), representing the magnitude of the run length (actual magnitude of run length is obtained by subtracting 14 from this value) and the second byte, (43), is the color index for the pixels. See FIG. 10 (color lookup table). Using one of these two techniques, block 468 produced Run Length encodings.

Conversely, if the Length of Run variable is less than the Run Length Minimum, block 465 passes control to block 469. Block 469 encrypts the pixel information using absolute mode encoding. See FIGS. 9 and 14 (describing absolute mode encoding).

Once the routine has encoded the pixel information, via block 468 or 469 of FIG. 4, the routine transfers control back to block 300 of FIG. 3.

On the other hand, if block 420 determines that (1) the number of non-compressed pixels left in the line plus the value of the Length of Run Variable is greater than the Run Length Minimum, and (2) the number of non-compressed pixels left in the line does not equal zero, block 420 passes control to block 425. Block 425 then calculates the Variance Value for the next intraframe pixel pair, e.g., using the formula Variance Value= $(R_2-R_1)^2+(G_2-G_1)^2+(B_2-B_1)^2$. If the Intraframe Tolerance is greater than or equal to the calculated Variance Value, block 430 passes control to block 455. Block 455 increments the Length of Run variable and subsequently returns control to block 420.

The process formed by blocks 420, 425 and 455 continues until either (a) block 430 determines that the Variance Value of an intraframe pixel pair is not within the Intraframe Tolerance or (b) block 420 determines that (1) the number of non-compressed pixels left in the line plus the value of the Length of Run Variable is less than, or equal to, the Run Length Minimum, or (2) the number of non-compressed pixels left in the line equals zero.

If block 430 discovers a Variance Value that is greater than the Intraframe Tolerance, the routine passes control to block 435. Block 435 then examines the value of the Length of Run variable relative to a specified Run Length Minimum. If the Length of Run variable is less than the specified Run Length Minimum, the routine passes control to block 436. In turn, block 436 encodes the pixels in absolute mode, in the manner previously described. See FIGS. 9 and 14 (describing absolute mode encoding).

Alternatively, if the Length of Run variable is greater than or equal to the specified Run Length Minimum, the routine passes control to block 437. Subsequently, block 437 encodes the pixels as a run length encoding byte grouping (using either the method of FIG. 9 or the method of FIG. 14).

Once either block 436 or block 437 has encoded the pertinent pixel information in the compressed version of the video data, the routine transfers control to block 438. Block 438 (1) sets the Length of Run variable to zero and (2) transfers control to block 440. Block 440 updates the address contained in the Previous Frame Pixel Pointer by adding the variable Length of Run to that address. Subsequently, block 440 passes control to block 445 which updates the Current Frame Pixel Pointer in an identical fashion. The routine then transfers control to block 320 of FIG. 3. At this point, block 320 restarts the interframe compression process by resetting the delta offsets to zero.

When block 330 determines that it has compared all the intraframe pixel pairs, it transfers control to block 331. In turn, blocks 331, 332 and 333 decide how to encode the pixel information in an identical manner to blocks 365, 370 and 380 as previously described. Once the routine has encoded the pixel information, the routine transfers control back to block 300 of FIG. 3. Subsequently, block 305 returns to block 260 of FIG. 2.

INTRAFRAME COMPRESSION

Figure 5:
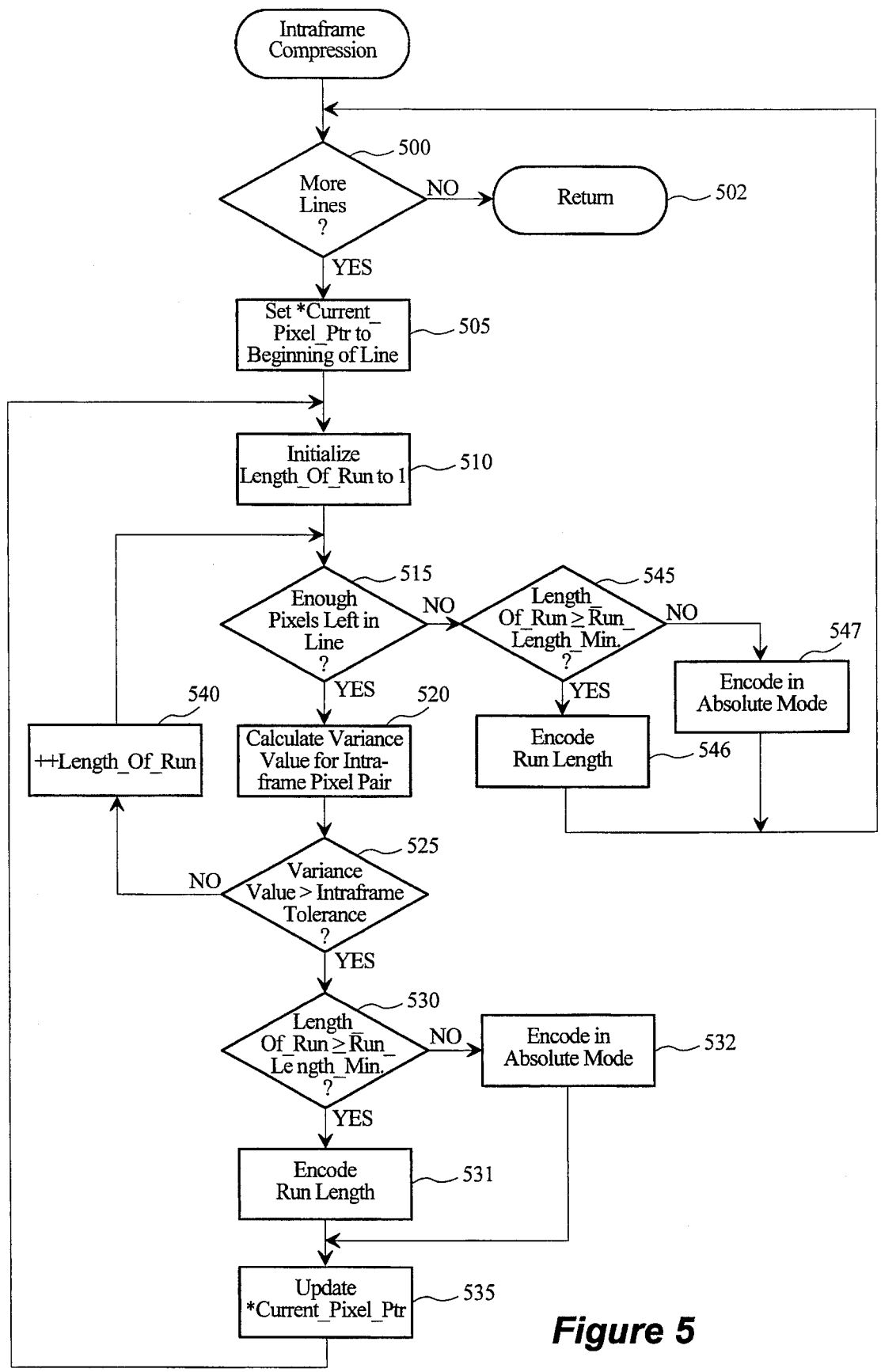
FIG. 5 is a flow diagram of the Intraframe Compression Routine of FIG. 2.

A flow chart for the intraframe compression routine is shown in FIG. 5. See FIG. 2 at block 250 (calling the routine of FIG. 5). The intraframe compression routine begins processing at block 500. Block 500 determines if there are any remaining uncompressed lines of video data in the frame. If the routine has compressed all the lines in the frame, block 500 transfers control to block 502. Subsequently, block 502 returns control to block 260 of FIG. 2. On the other hand, if block 500 of FIG. 5 determines that there is at least one remaining line of uncompressed video data, block 500 transfers control to block 505.

In block 505, the routine sets the contents of a Current Pixel Pointer to the address of the first pixel in the next line of uncompressed raw video data. Subsequently, the routine transfers control to block 510 which initializes the Length of Run variable to one. As previously described, the routine uses the Length of Run variable to keep track of the number of consecutive pixels that are within the Intraframe Tolerance.

Subsequently, block 515 determines if (1) the number of non-compressed pixels left in the line plus the value of the Length of Run Variable is greater than the Run Length Minimum and (2) the number of non-compressed pixels left in the line does not equal zero. If both the tests of block 515 are affirmative, block 515 transfers control to block 520. In turn, block 520 calculates the Variance Value for the pair of pixels referenced by (1) the address in the Current Pixel Pointer and (2) the address in the Current Pixel Pointer plus the value of the Length of Run variable. Subsequently, block 525 evaluates the Variance Value in light of the Intraframe Tolerance.

If the Intraframe Tolerance is greater than or equal to the Variance Value, block 525 transfers control to block 540. Block 540 increments the Length of Run variable and transfers control back to block 515. Blocks 515, 520, 525 and 540 continue comparing intraframe pixel pairs until either (1) block 525 finds a pixel pair whose Variance Value is greater than the Intraframe Tolerance or (2) block 515 determines that (a) the number of non-compressed pixels left in the line plus the value of the Length of Run Variable is less than or equal to the Run Length Minimum or (b) the number of non-compressed pixels left in the line equals zero.

If the routine discovers a pixel pair whose Variance Value is greater than the Intraframe Tolerance, block 525 transfers control to block 530. Block 530 determines if the Length of Run variable has a value greater than, or equal to, a specified Run Length Minimum. As previously described, the Run Length Minimum is a threshold value that the routine uses to determine whether it is efficient to encode a string of pixels as a run length as opposed to in absolute mode (See discussion relative to block 468 of FIG. 4).

When block 530 discovers a run length greater than or equal to the specified Run Length Minimum, block 530 transfers control to block 531 which encodes a run length using either the run length encoding method of FIG. 9 or the run length encoding method of FIG. 14 (methods described previously in discussion of block 468 of FIG. 4).

On the other hand, if block 530 discovers that the run length is less than the specified Run Length Minimum, block 530 transfers control to block 532. In turn, block 532 encodes the pixel information in absolute mode in the manner previously described. See FIGS. 9 and 14 (describing absolute mode encoding). Once the routine has encoded the pixels, either by run length encoding via block 531, or, by absolute mode encoding via block 532, the routine transfers control to block 535.

Block 535 updates the Current Pixel Pointer to point to the next non-compressed pixel in the raw data frame. Subsequently, the routine returns control to block 510 which renews the intraframe compression process by re-initializing the Length of Run variable to 1.

On the other hand, if block 515 determines that (1) the number of non-compressed pixels left in the line plus the value of the Length of Run Variable is less than, or equal to, the Run Length Minimum or (2) the number of non-compressed pixels left in the line equals zero, the routine transfers control to block 545. Blocks 545, 456 and 457 encode the pixel information in a manner identical to that of blocks 530, 531 and 532, as previously described. Once the routine has encoded the pixel information, it transfers control back to block 500, which checks for an additional line of uncompressed data.

SPLIT FRAME ROUTINE

Figure 6:
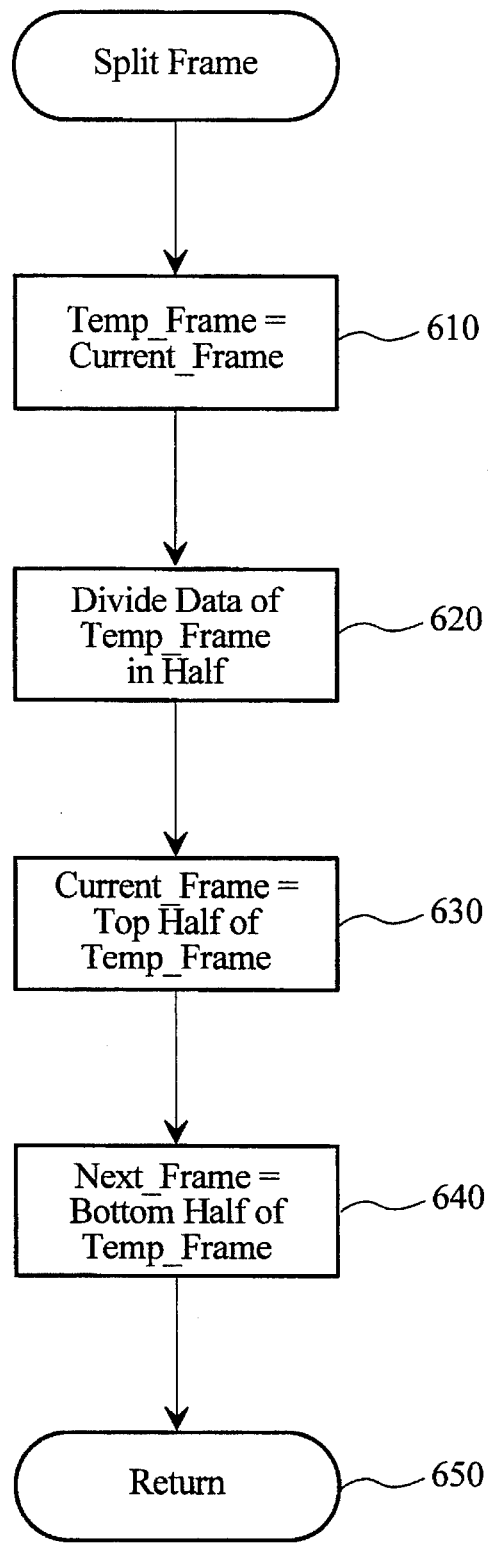
FIG. 6 is a flow diagram of the Split Frame Routine of FIG. 1.

A flow diagram of the split frame routine is shown in FIG. 6. See FIG. 1 at block 150 (calling the routine of FIG. 6. Essentially, the routine of FIG. 1 will only call this split frame routine when it cannot compress the frame to the given target range without unduly impairing the quality of the encoded image, i.e., if increasing the tolerance would cause the routine to produce a compressed frame below a minimum acceptable resolution level. In these situations, the present embodiment of the invention divides the raw data in two parts. Once divided, each half of the raw data is compressed separately.

The splitting process begins in block 610 which renames the raw data of the current frame to tempframe. Block 620 then divides the data of tempframe in half. Subsequently, block 630 reassigns the name "current frame" to the top half of the tempframe data. Similarly, block 640 reassigns the name "next frame" to the bottom half of the tempframe data. Once the routine develops the current frame and next frame in this fashion, block 650 returns control to block 110 of FIG. 1.

DECOMPRESSION METHOD

Figure 7:
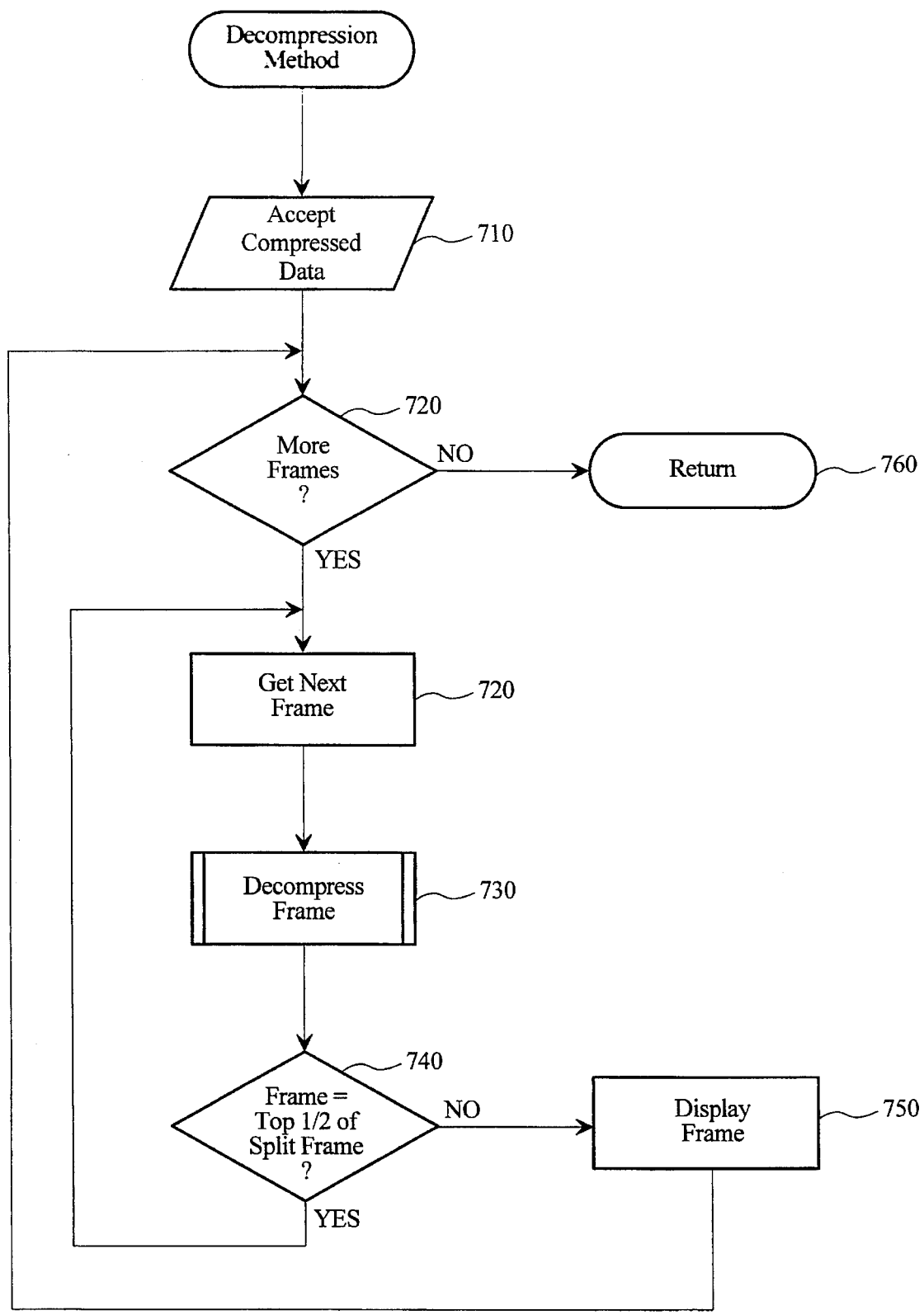
FIG. 7 is a flow diagram of the Decompression Routine.

A flowchart for a decompression routine of the present invention is shown in FIG. 7. Essentially, this routine takes the frames compressed by the routines of FIGS. 1–6 and expands them into a displayable format. The decompression process begins in block 700 which accepts the compressed data of a video movie. Subsequently, block 710 determines if the routine has decompressed all encoded frames of the video movie. If at least one frame remains compressed, block 710 transfers control to block 720 which retrieves the compressed frame.

Subsequently, block 730 calls the subroutine which actually decompresses the frame. In turn, block 740 determines if the frame last compressed was merely the top half of a raw data frame. If the last decompressed frame was only the top half of a raw data frame, the routine delays the display of the decompressed data until it decompresses the bottom half of the frame. Block 740 accomplishes this delay by transferring control to block 720 instead of to the display block 750. Subsequently, block 720 retrieves the bottom half of the split frame. Block 730 then calls the Decompress Frame subroutine which decompresses the bottom half of the raw data frame.

Once the subroutine of block 730 returns block 750 displays the frame, e.g., on a video monitor. After block 750 has displayed the frame, it returns control to block 710. In this manner, the routine decompresses and displays all the frames of the movie. Once the routine has displayed the entire movie, block 760 returns to the application which called the decompression routine.

DECOMPRESS FRAME ROUTINE

Figure 8:
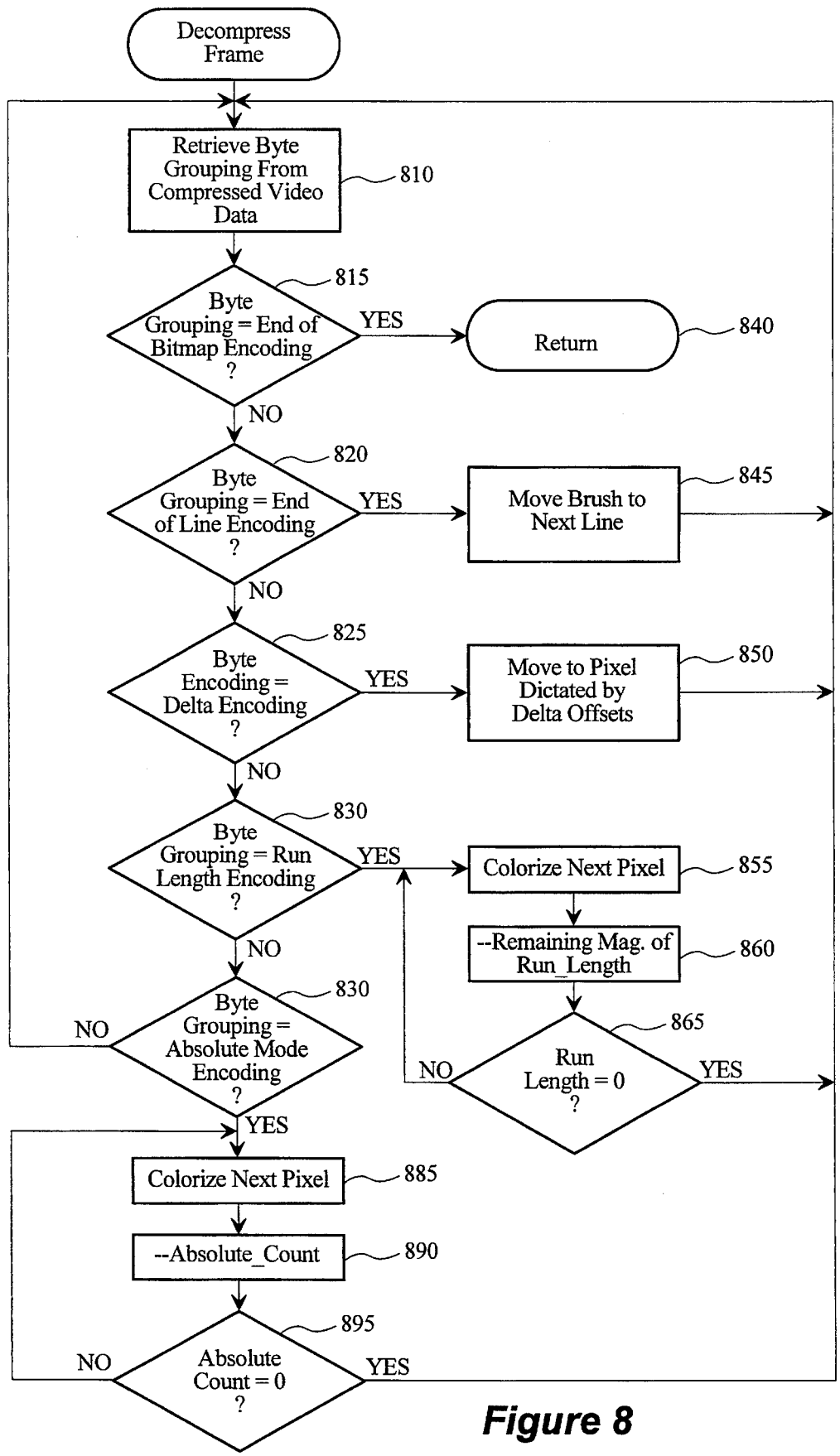
FIG. 8 is a flow diagram of the Decompress Frame Routine, a routine available in the prior art, of FIG. 7.

A flowchart for the Decompress Frame routine is shown in FIG. 8. See FIG. 7 at block 730 (calling the routine of FIG. 8). The processing of the decompress frame routine begins at block 810. In block 810, the routine retrieves a byte grouping from the compressed video data.

Subsequently, block 815 tests the byte grouping to see if it is an end of bitmap encoding. If block 815 determines that the byte grouping is an end of bitmap encoding, the routine passes control to block 840. Because an end of bitmap indicates the end of the compressed data for the frame, block 840 returns to block 740 of FIG. 7.

However, if the unit is not an end of bitmap encoding, block 815 transfers control to block 820. If block 820 determines that the byte grouping is an end of line encoding, the routine transfers control to block 845. In turn, block 845 moves the brush to the next line of the decompressed version of the video data. Once block 845 has moved the brush, the routine transfers control to block 810.

On the other hand, if the byte grouping is not an end of line encoding, block 820 transfers control to block 825. If block 825 determines that the byte grouping is a delta encoding, the routine transfers to block 850. In turn, block 850 moves the brush to the location dictated by the delta offset(s). For example, a delta may have encoded a horizontal offset of five and a vertical offset of zero. In this case, the routine will horizontally displace the brush five pixels from its current position. Once block 850 has moved the brush, the routine transfers control to block 810.

Alternatively, if the byte grouping is not a delta encoding, block 825 transfers control to block 830. If block 830 determines that the byte grouping is a run length encoding, block 830 transfers control to block 855. Block 855 colorizes the next available pixel in the decompressed data and transfers control to block 860. Block 860 decrements the remaining magnitude of the run length and transfers control to block 865. Subsequently, block 865 tests the remaining magnitude of the run length for a null value. If the remaining magnitude of the run length is a null value, the routine has painted all pixels of the run, and block 865 returns control to block 810. On the other hand, if the remaining magnitude of the run length is not zero, block 865 transfers control back to block 855. In this manner, blocks 855, 860 and 865 paint every pixel indicated by the encoded run length and associated color value.

If the byte grouping is not a run length encoding, block 830 transfers control to block 880. If block 880 determines that the byte grouping is an absolute mode encoding, block 880 transfers control to block 885. Block 885 retrieves the next color index from the absolute mode encoding and colorizes the next available pixel in the decompressed data before transferring control to block 890. In turn, block 890 decrements the value of the byte indicating the remaining number of absolute mode encoded pixels and transfers control to block 865. See FIGS. 9 and 14 (describing absolute mode encoding). Subsequently, block 865 of FIG. 8 tests the value of the decremented byte for a null value. If the value of the byte indicating the remaining number of absolute mode encoded pixels is zero, the routine has painted all the absolutely encoded pixels. Consequently, block 895 returns control to block 810. On the other hand, if the value of the byte indicating the remaining number of absolute mode encoded pixels is not zero, block 895 transfers control back to block 885. In this manner, blocks 885, 890 and 895 paint every absolutely encoded pixel indicated by the byte grouping. Finally, if block 880 does not recognize the byte grouping as an absolute encoding, the routine ignores the data by transferring control to block 810.

COMPRESSION EXAMPLE

Figure 11:
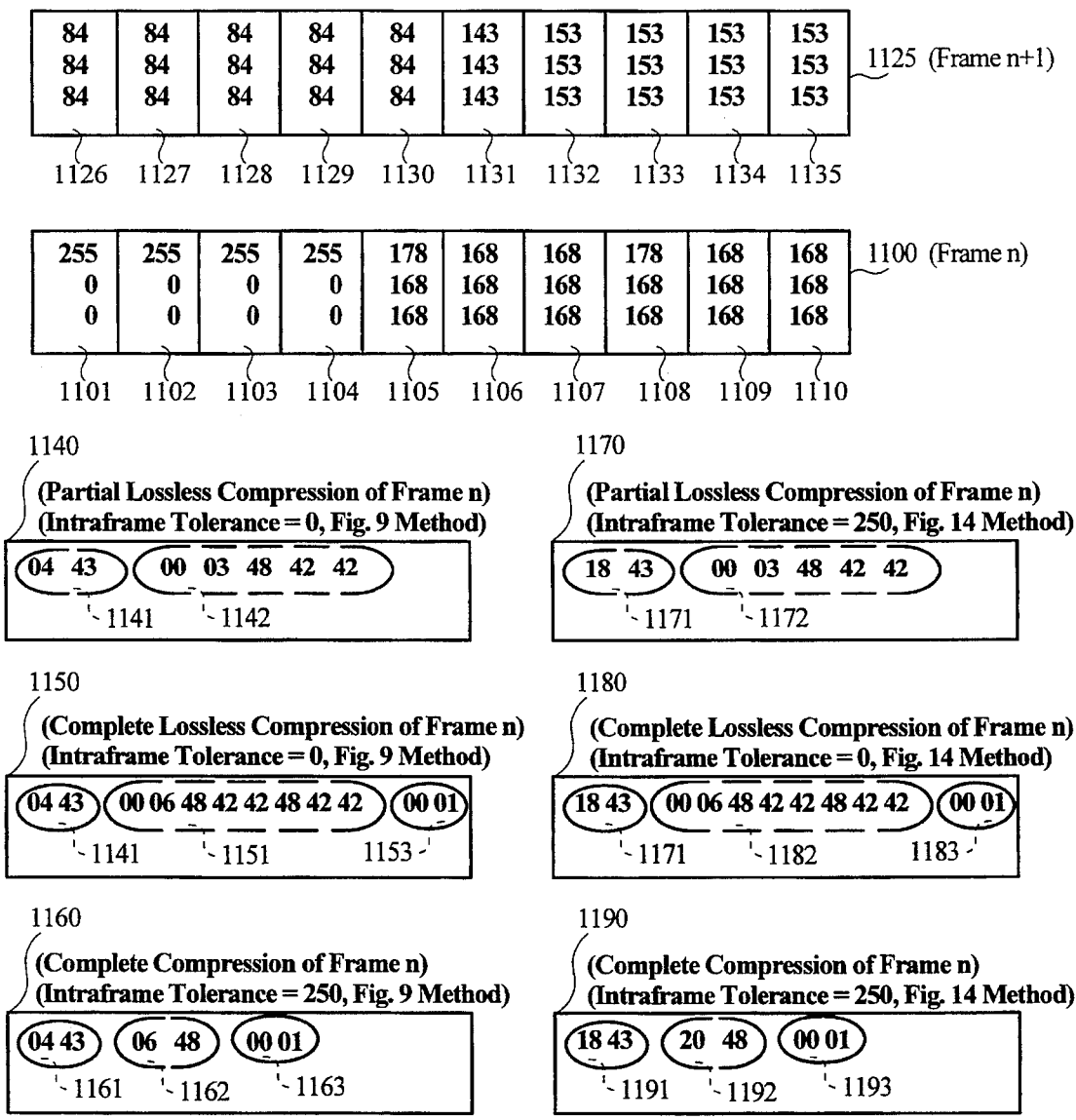
FIG. 11 illustrates the production of compressed data using the Intraframe Compression Routine of FIG. 5.
Figure 12:
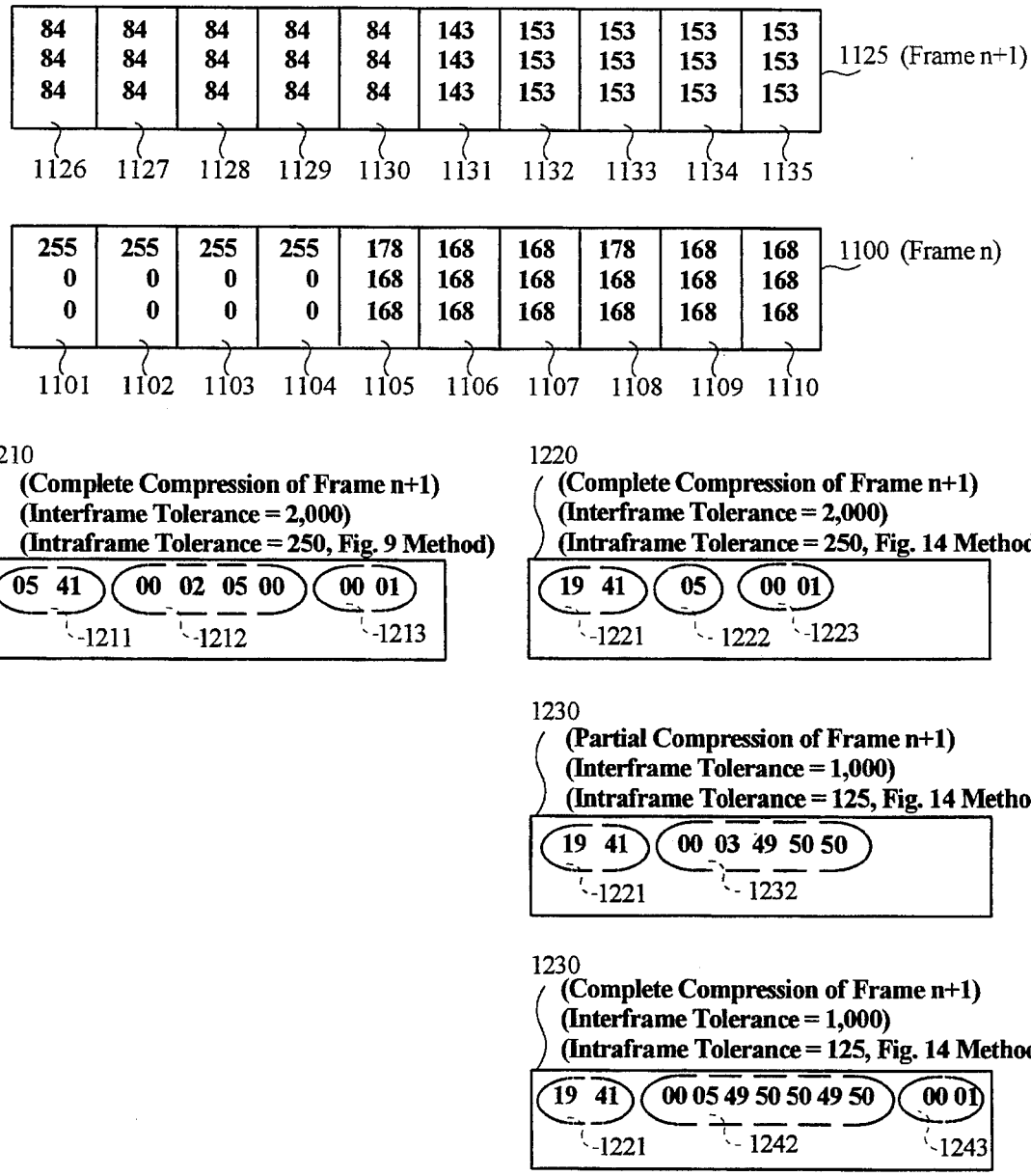
FIG. 12 illustrates the production of compressed data using the Interframe Compression Routine of FIGS. 3 and 4.

FIGS. 11 and 12 illustrate by way of example the invention's compression of a video movie. The example will be described in detail below. However, for convenience to the reader, the following overview of the example has been prepared.

For brevity, the example movie is only 2 frames long and each frame is comprised a single ten pixel line. See FIG. 11 (blocks 1100 and 1125 representing the raw video data for frames n and n+1, respectively, of the two frame movie). Additionally, the invention uses an inclusive target range of 6–11 bytes for the compressed data. When encoding the compressed data, the invention uses the color lookup table of FIG. 10 and illustrates how the compressed data would be represented by both (1) the encoding technique of FIG. 9, and (2) the encoding technique of FIG. 14. The advantageous nature of FIG. 14 is made evident by contrasting the results of the two encoding techniques.

In its present embodiment, the invention begins by attempting to encode the frames of video data losslessly, e.g., using Intraframe and Interframe Tolerances of zero. If the invention cannot losslessly encode a frame within the target range, the invention compresses using the tolerance values that achieved compression within the target range for the frame that preceded the frame currently being compressed, i.e., if the invention were currently compressing frame "n", the invention would initiate compression utilizing the final tolerance values of frame "n−1."

If the previously used tolerance values cannot compress frame "n" to the given target range, the present embodiment compresses the frame using the maximum possible tolerance values. The invention does this in order to save time, i.e., to quickly determine if the frame will have to be split. If there is no maximum tolerance value available because the user does not desire frame splitting to be done, the invention will attempt to compress the frame using the previously described first guess values, i.e., a first guess of 250 for an Intraframe Tolerance and a first guess of 2000 for an Interframe Tolerance.

For purposes of brevity, this example does not describe compression using the maximum tolerance values. Instead, the invention first attempts lossless encoding, i.e., tolerance values of zero, only for frame n. Subsequently, the example attempts to compress frame n using first guess values, i.e., an Intraframe Tolerance of 250. When compressing frame n+1, the example begins compression using tolerance values derived from the Intraframe Tolerance value that worked for frame n. Additionally, the example assumes that 1,500 is the Maximum Intraframe Tolerance.

The compression example begins with the lossless run length encoding of frame n (block 1100 of FIG. 11). The invention losslessly encodes the data of frame n by using an Intraframe Tolerance of zero. However, in this case, the invention cannot losslessly compress frame n within the target range of 6–11 bytes.

In an attempt to achieve a compressed version of frame n within the target range, the invention recompresses the frame using an Intraframe Tolerance of 250 (as previously mentioned, 250 was determined by experimentation to be an appropriate initial Intraframe Tolerance). Using a tolerance of 250, the invention compresses frame n, block 1100, within the target range.

The example continues with the compression of frame n+1 (block 1125 of FIG. 12). The invention compresses frame n+1 using an Intraframe Tolerance of 250 and an Interframe Tolerance of 2,000. The invention continues to use 250 as an Intraframe Tolerance because the value worked well with the compression of frame n (frame n+1 is likely to be similar to frame n). The invention initiates interframe compression using an Interframe Tolerance of 2,000, because, as previously mentioned, an Interframe Tolerance eight times the value of the Intraframe Tolerance was heuristically determined to be appropriate.

Using these two tolerances and the encoding method of FIG. 9, the invention compresses frame n+1, block 1125 of FIG. 12, within the target range. See FIG. 12, block 1210. However, using these same two tolerances, the encoding method of FIG. 14, compresses frame n+1, block 1125, beneath the floor of the target range, i.e., less than six bytes. See FIG. 12, block 1220.

As a result, the invention decreases the Interframe Tolerance to 1000 (using the previously described modified binary search) and recompresses frame n+1. Using the new Interframe Tolerance and the encoding method of FIG. 14, the invention is able to compress the frame within the target range. Additionally, the invention is able to encode more information when compressing frame n+1 with the encoding method of FIG. 14 than with the encoding method of FIG. 9. Compare FIG. 12 blocks 1210 and 1230. The example will now be described in detail.

Referring to both FIGS. 1 and 11, the compression process begins at block 100 of FIG. 1. Block 100 of FIG. 1 accepts the raw video data of the movie (blocks 1100 and 1125 of FIG. 11). Next, block 100 of FIG. 1 identifies block 1100 of FIG. 1 as the next raw data frame to compress. As a result, block 100 of FIG. 1 transfers control to block 110 which calls the Compress Frame routine of FIG. 2.

In turn, block 200 of FIG. 2, discovers that block 1100 of FIG. 11 is the first frame of the video movie to be compressed. Consequently, block 200 of FIG. 2 transfers control to block 250: Block 250 calls the Intraframe Compression routine of FIG. 5.

As described in the introductory remarks, the invention initiates the intraframe compression process by attempting to losslessly encode the raw data within the target range, i.e., by using run length encoding with a Intraframe Tolerance value of zero.

First, block 500 of FIG. 5 determines that block 1100 of FIG. 11 is an uncompressed line of video data and subsequently block 505 of FIG. 5 transfers control to block 510. In turn, block 505 begins the lossless compression of the line by setting the contents of the Current Pixel Pointer to the address of pixel 1101 in block 1100 of FIG. 11. Next, block 510 of FIG. 5 initializes the Length of Run variable to one and passes control to block 515.

Block 515 determines if (1) the number of non-compressed pixels left in the line plus the value of the Length of Run Variable is greater than the Run Length Minimum or (2) the number of non-compressed pixels left in the line equals zero. In this case, the number of non-compressed pixels left in the line, (10), plus the value of the Length of Run variable, (1), is greater than the Run Length Minimum, (4). As a result, block 515 transfers control to block 520. In turn, block 520 calculates a Variance Value based on the color attributes of pixels 1101 and 1102 of FIG. 11 (the pixels referenced by (1) the contents of the Current Pixel Pointer and (2) the contents of the Current Pixel Pointer plus the Length of Run Variable).

In this embodiment, the invention calculates the Variance Value by summing the squares of the differences of each respective color component of the two pixels, i.e., Variance Value=$(255-255)^2+(0-0)^2+(0-0)^2$=0. In this case, the Variance Value of zero is equal to the Intraframe Tolerance. Consequently, block 525 of FIG. 5 transfers control to block 540. In turn, block 540 increments the Length of Run variable and returns control to block 515.

Block 515 determines that the number of non-compressed pixels left in the line, (8), plus the value of the Length of Run variable, (2), is greater than the Run Length Minimum, (4), and, as a result, block 515 passes control to block 520. Block 520 calculates the Variance Value for pixels 1101 and 1103 of FIG. 11: Again, this value is zero [$0=(255-255)^2+(0-0)^2+(0-0)^2$]. Subsequently, block 525 of FIG. 5 passes control to block 540 which increments the Length of Run variable to three before passing control to block 515.

Once more block 515 determines that the number of non-compressed pixels left in the line, (7), plus the value of the Length of Run variable, (3), is greater than the Run Length Minimum, (4). In response to this finding, block 515 passes control to block 520. Block 520 calculates the Variance Value for pixels 1101 and 1104 of FIG. 11. In this case, the calculated Variance Value is zero [$0=(255-255)^2+(0-0)^2+(0-0)^2$]. Because the pair's Variance Value is not greater than the Intraframe Tolerance, block 525 of FIG. 5 again passes control to block 540. In turn, block 540 increments the Length of Run variable to four. Subsequently, block 540 passes control to block 515.

Because the number of non-compressed pixels left in the line, (6), plus the value of the Length of Run variable, (4), is greater than the Run Length Minimum, (4), block 515 passes control to block 520. In turn, block 520 calculates the Variance Value for pixels 1101 and 1105 of FIG. 11: the value being 62,377 [$62,377=(178-255)^2+(168-0)^2+(168-0)^2$]. Since this value is much greater than the Intraframe Tolerance of zero, block 525 of FIG. 5 transfers control to block 530.

Block 530 examines the magnitude of the Length of Run variable. In this case, the Length of Run variable has a value equal to the Run Length Minimum (value of four). Consequently, block 530 transfers control to block 531. Block 531 encodes pixels 1101, 1102, 1103 and 1104 of FIG. 11 as a run length encoding.

FIGS. 9 and 14 describe two possible methods of producing run length encoding. For completeness, this example illustrates both methods: Blocks 1140, 1150 and 1160 of FIG. 11 and block 1210 of FIG. 12 use the encoding method of FIG. 9, while blocks 1170, 1180 and 1190 of FIG. 11 and blocks 1220, 1230 and 1240 of FIG. 12 use the encoding method of FIG. 14. Under normal circumstances, however, only one of the encoding methods would be used by an application.

Block 1140 of FIG. 11 is a partial encodement of the losslessly compressed data of block 1100 produced using the encoding method disclosed by FIG. 9. The byte grouping 1141 inside block 1140 of FIG. 11 is the run length encoding of pixels 1101, 1102, 1103 and 1104. The first byte, (04), of this grouping, is the magnitude of the run length. The second byte, (43), of this grouping is the color index, from the color lookup table of FIG. 10, for the RGB color values of (255, 0, 0).

Similarly, block 1170 of FIG. 11 is a partial encodement of the losslessly compressed data of block 1100 produced using the encoding method disclosed by FIG. 14. The byte grouping 1171 inside block 1180 of FIG. 11 is the run length encoding of pixels 1101, 1102, 1103 and 1104. The first byte, (18), of this grouping, is proportional to the magnitude of the run length: The actual magnitude to the run length is obtained by subtracting 14 from the byte. The second byte, (43), of this grouping is the color index for pixels 1101, 1102, 1103 and 1104. See FIG. 10 (color lookup table).

Once block 531 of FIG. 5 encodes the run length, block 535 updates the contents of the Current Pixel Pointer to point to the last pixel that the invention examined; in this case, pixel 1105 of FIG. 11. After block 535 of FIG. 5 updates the pointer, it returns control to block 510 which reinitializes the Length of Run variable to one.

Subsequently, block 515 determines that the number of non-compressed pixels left in the line, (6), plus the Length of Run variable, (1), is greater than the Run Length Minimum (4). As a result, block 515 passes control to block 520. Block 520 calculates the Variance Value for pixels 1105 and 1106 of FIG. 11. In this case the Variance Value is 100 [$100=(168-178)^2+(168-168)^2+(168-168)^2$]. Because 100 is greater than the Intraframe Tolerance of zero, block 525 transfers control to block 530. In turn, block 530 determines that the Length of Run variable (1) is less than the Run Length Minimum (4), and transfers control to block 532.

Block 532, encodes the pixels information in absolute mode: For efficiency reasons, absolute mode encoding encrypts a minimum of three pixels, i.e., because the absolute mode escape sequence itself constitutes two bytes, it would be wasteful to encode three bytes to encode a single pixel. Moreover, the escape sequences [00 01] and [00 02], the logical escape sequences for one and two byte absolute mode encoding, are already used for end of bitmap and delta encoding. See FIGS. 9 and 14 (describing absolute, end of bit map and delta encoding).

Due to these efficiency concerns, the invention, using the method of FIG. 9, encodes pixels 1105, 1106 and 1107 of FIG. 11 as the byte grouping of 1142 in block 1140. Similarly, using the method of FIG. 14, the invention would encode pixels 1105, 1106 and 1107 of FIG. 11 as the byte grouping 1172 of block 1170. Because the absolute encoding methods of FIG. 9 and FIG. 14 are identical, the byte groupings 1142 and 1172 of FIG. 11 are identical. The first two bytes, (00 and 03), of each grouping identify the following three bytes, (48, 42, and 42), as absolutely encoded pixels: (48) and (42) are color indexes for RGB values of (178, 168, 168) and (168, 168, 168), respectively. See FIG. 10 (color lookup table). Once block 532 of FIG. 5 encodes pixels 1105, 1106 and 1107 of FIG. 11, block 532 of FIG. 5 passes control to block 535.

In turn, block 535 updates the contents of the Current Pixel Pointer to point to the next pixel to be examined, i.e., pixel 1108 of FIG. 11. Subsequently, block 535 of FIG. 5 passes control to block 510. Block 510 re-initializes the Length of Run variable to 1 and passes control to block 515. Block 515 determines that the number of non-compressed pixels left in the line, (3), plus the value of the Length of Run variable, (1), is not greater than the Run Length Minimum, (4), and block 515 subsequently passes control to block 545.

Block 545 discovers that the value of the Length of Run variable is less than the Run Length Minimum and passes control to block 547. In turn, block 547 encodes the remaining pixels of the line, pixels 1108, 1109 and 110 in block 1100 of FIG. 11, in absolute mode. For efficiency reasons, block 547 of FIG. 5 encodes these pixels by combining them with the previously absolute mode encoded pixels, i.e., the pixels 1105, 1106 and 1107 in block 1100 of FIG. 11 (pixels 1105, 1106 and 1107 previously encoded in byte groupings 1142 and 1172 in blocks 1140 and 1170, respectively). As a result, pixels 1105, 1106, 1107, 1108, 1109 and 1110 are represented by a single byte grouping.

Using the method of FIG. 9, the byte grouping 1152 in block 1150 of FIG. 11 represents these pixels. Similarly, using the method of FIG. 14, the byte grouping 1182 of block 1180 represents these pixels.

As previously mentioned, for absolute encoding, the two methods represented by FIGS. 9 and 14 are equivalent. Therefore, byte groupings 1152 and 1182 of FIG. 11 are equivalent. The first two bytes, (00 and 06), of each grouping identify the following six bytes, (48, 42, 42, 48, 42, and 42), as absolutely encoded pixels: (48) and (42) are color indexes for RGB values of (178, 168, 168) and (168, 168, 168), respectively. See FIG. 10 (color lookup table). After block 547 of FIG. 5 encodes these pixels, block 547 also encodes an end of bitmap escape code to signal the end of the frame (byte grouping 1153 in block 1150 and byte grouping 1183 in block 1180). This encoding is straightforwardly explained by FIGS. 9 and 14.

Once block 547 of FIG. 5 has encoded the end of bitmap byte grouping, the lossless compression of the data of block 1100 of FIG. 11 is complete. Subsequently, block 500 of FIG. 5 (1) recognizes that there are no more lines of uncompressed video data in block 1100 of FIG. 11 and (2) transfers control to block 502 of FIG. 5. In turn, block 502 returns control to block 260 of FIG. 2. From this point block 260 returns control to block 120 of FIG. 1.

Block 120 examines the size of the losslessly encoded compressed data [block 1150 of FIG. 11 (compressed using FIG. 9 method) and block 1180 of FIG. 11 (compressed using FIG. 14 method)]. In this case, block 120 of FIG. 1 determines that both blocks 1150 and 1180 of FIG. 11, each having 12 bytes of data, are larger than the ceiling of the target range (ceiling equals 11 bytes).

As a result, block 120 passes control to block 130. Block 130 determines if the frame should be split. Since the last used Intraframe Tolerance was zero, and therefore not greater than the Maximum Intraframe Tolerance of 1500. Block 130 passes control to block 140. In turn, block 140 increases the Intraframe Tolerance to 250 and passes control to block 110 (as previously mentioned 250 was determined by experimentation to be an appropriate first guess for the Intraframe Tolerance). In turn, block 110 calls the Compress Frame routine of FIG. 2.

Block 200 of FIG. 2 determines that block 1100 of FIG. 11 is the first frame of the movie and passes control to block 250 of FIG. 2. Once block 250 has control, it calls the Intraframe compression routine of FIG. 5.

Once more, block 500 of FIG. 5 (1) determines that block 1100 of FIG. 11 is an uncompressed line of video data and (2) transfers control to block 505 of FIG. 5. Block 505 sets the contents of the Current Pixel Pointer to the address of pixel 1101 in block 1100 of FIG. 11. Next, block 510 of FIG. 5 initializes the Length of Run variable to one and passes control to block 515.

Block 515 determines that the number of non-compressed pixels left in the line, (10), plus the value of the Length of Run variable, (1), is greater than the Run Length Minimum, (4), and passes control to block 520. In turn block 520 calculates a Variance Value based on the color attributes of pixels 1101 and 1102 of FIG. 11 and passes control to block 525 of FIG. 5.

In this case, the pixels Variance Value is zero, $[0=(255-255)^2+(0-0)^2+(0-0)^2]$, and therefore less than the Intraframe Tolerance of 250. As a result, block 525 transfers control to block 540. In turn, block 540 increments the Length of Run variable to two and returns control to block 515.

Block 515 determines that the number of non-compressed pixels left in the line, (8), plus the value of the Length of Run variable, (2), is greater than the Run Length Minimum, (4), and, as a result, block 515 passes control to block 520. Block 520 calculates the Variance Value for pixels 1101 and 1103 of FIG. 11: Again, this value is zero $[0=(255-255)^2+(0-0)^2+(0-0)^2]$. Block 525 of FIG. 5, recognizing the calculated variance value as being less than the Intraframe Tolerance, passes control to block 540. In turn, block 540 increments the Length of Run variable to three.

Once more, block 515 determines that the number of non-compressed pixels left in the line, (7), plus the value of the Length of Run variable, (3), is greater than the Run Length Minimum, (4), subsequently, block 515 passes control to block 520. In turn, block 520 calculates the Variance Value for pixels 1101 and 1104 of FIG. 11. The calculated Variance Value is zero $[0= (255-255)^2+(0-0)^2+(0-0)^2]$. Because the pair's Variance Value is not greater than the Intraframe Tolerance, block 525 of FIG. 5 again passes control to block 540. In turn, block 540 increments the Length of Run variable to four before passing control to block 515.

Because the number of non-compressed pixels left in the line, (6), plus the value of the Length of Run variable, (4), is greater than the Run Length Minimum, (4), block 515 passes control to block 520. In turn, block 520 calculates the Variance Value for pixels 1101 and 1105 of FIG. 11, which, in this case, is 62,377 $[62,377=(178-255)^2+(168-0)^2+(168-0)^2]$. Since this value is much greater than the Intraframe Tolerance of 250, block 525 of FIG. 5 transfers control to block 530.

Block 530 examines the magnitude of the Length of Run variable. In this case, the Length of Run variable has a value equal to the Run Length Minimum (value of four). Consequently, block 530 transfers control to block 531. Block 531 encodes pixels 1101, 1102, 1103 and 1104 as a run length encoding in blocks 1160 and 1190.

Block 1160 is the compressed data of block 1100 produced with (1) an Intraframe Tolerance of 250 and (2) the encoding method of by FIG. 9. The byte grouping 1161 inside block 1160 of FIG. 11 represents pixels 1101, 1102, 1103 and 1104 as a run length encoding. As described previously, the first byte, (04), of this grouping is the magnitude of the run length and the second byte, (43), is the pixel's color index from the color lookup table of FIG. 10.

Similarly, block 1190 of FIG. 11 is the data of block 1100 produced with (1) an Intraframe Tolerance of 250 and (2) the encoding method of by FIG. 14. The byte grouping 1191 inside block 1190 of FIG. 11 represents pixels 1101, 1102, 1103 and 1104 as a run length encoding. As described previously relative to block 1170, the first byte, (18), of this grouping is proportional to the magnitude of the run length (the actual magnitude to the run length is obtained by subtracting 14 from the byte) The second byte, (43), of this grouping is the pixels' color index. See FIG. 10 (color lookup table).

Once block 531 of FIG. 5 encodes the run length, block 535 updates the contents of the Current Pixel Pointer to point to the last pixel that the invention examined, i.e., pixel 1105 of FIG. 11. After block 535 of FIG. 5 updates the pointer, the routine returns control to block 510 which reinitializes the Length of Run variable to one.

Subsequently, block 515 determines that the number of non-compressed pixels left in the line, (6), plus the Length of Run variable, (1), is greater than the Run Length Minimum, (4). As a result, block 515 passes control to block 520. Block 520 calculates the Variance Value for pixels 1105 and 1106 of FIG. 11. In this case the Variance Value is 100 $[100=(168-178)^2+(168-168)^2+(168-168)^2]$. In contrast to the lossless compression previously conducted, this Variance Value is no longer greater than the Intraframe Tolerance (Intraframe Tolerance increased from zero to 250 by block 140 of FIG. 1). As a result, block 525 of FIG. 5 transfers control to block 540 which increments the Length of Run variable to two before transferring control to block 515.

Block 515 determines that the number of non-compressed pixels left in the line, (4), plus the value of the Length of Run variable, (2), is greater than the Run Length Minimum, (4). As a result, block 515 passes control to block 520. In turn, block 520 calculates the Variance Value for pixels 1105 and 1107 of FIG. 11. Again, the Variance Value is 100 $[100=(168-178)^2+(168-168)^2+(168-168)^2]$. Since 100 is less than the Intraframe Tolerance of 250, block 525 of FIG. 5 transfers control to block 540 which (1) increments the Length of Run variable to three and (2) passes control to block 515.

Block 515 determines that the number of non-compressed pixels left in the line, (3), plus the value of the Length of Run variable, (3), is greater than the Run Length Minimum, (4), and then passes control to block 520. Block 520 calculates the Variance Value for pixels 1105 and 1108 of FIG. 11. In this case, the Variance Value is zero $[0=(178-178)^2+(168-168)^2+(168-168)^2]$. Because zero is less than the Intraframe Tolerance of 250, block 525 of FIG. 5 transfers control to block 540 which (1) increments the Length of Run variable to four and (2) passes control to block 515.

Block 515 determines that the number of non-compressed pixels left in the line, (2), plus the value of the Length of Run variable, (4), is greater than the Run Length Minimum, (4). Consequently, the routine passes control to block 520. In turn, block 520 calculates the Variance Value for pixels 1105 and 1109 of FIG. 11. In this case the Variance Value is 100 $[100=(168-178)^2+(168-168)^2+(168-168)^2]$. Since 100 is less than the Intraframe Tolerance of 250, block 525 of FIG. 5 transfers control to block 540 which (1) increments the Length of Run variable to 5 and (2) passes control to block 515.

Block 515 determines that the number of non-compressed pixels left in the line, (1), plus the value of the Length of Run variable, (5), is greater than the Run Length Minimum, (4). In response to this determination, the routine passes control to block 520. Once block 520 has control, it calculates the Variance Value for pixels 1105 and 1110 of FIG. 11. In this case the Variance Value is 100 $[100=(168-178)^2+(168-168)^2+(168-168)^2]$. Because 100 is less than the Intraframe Tolerance of 250, block 525 of FIG. 5 transfers control to block 540 which (1) increments the Length of Run variable to 6 and (2) passes control to block 515.

At this point, block 515 determines that the number of non-compressed pixels left in the line is zero and passes control to block 545. In turn, block 545 discovers that the value of the Length of Run variable, (6), is greater than the Run Length Minimum, (4), and passes control to block 546. As a result, block 546 encodes pixels 1105, 1106, 1107, 1108, 1109 and 1110 of FIG. 11, as a run length encoding. This run length encoding is represented by (1) byte grouping 1162 in block 1160 of FIG. 11 and (2) byte grouping 1192 in block 1190 of FIG. 11 (as previously mentioned, block 1160 illustrates the encoding method of FIG. 9 and block 1190 illustrates the encoding method of FIG. 14).

Regarding the byte grouping 1162 of FIG. 11, the first byte, (06), of the grouping is the magnitude of the run length. The second byte, (48), of the grouping is the color index for the RGB color values of (255, 0, 0). See FIG. 10 (color lookup table).

Similarly, regarding the byte grouping 1192 of FIG. 11, the first byte, (20), of the grouping, is proportional to the magnitude of the run length: The actual magnitude to the run length is obtained by subtracting 14 from the byte. Identical to the second byte of byte grouping 1162, the second byte, (48), of byte grouping 1192 is the color index for the RGB color values of (255, 0, 0). See FIG. 10 (color lookup table).

After block 546 of FIG. 5 encodes pixels 1105, 1106, 1107, 1108, 1109 and 1110 of FIG. 11 as a run length encoding, block 546 of FIG. 5 encodes an end of bitmap escape code (byte grouping 1163 in block 1160 and byte grouping 1193 in block 1190). The end of bitmap encoding is straightforwardly explained by FIGS. 9 and 14.

Once block 546 of FIG. 5 has encoded these last two byte groupings, block 500 transfers control to block 502. Subsequently, block 502 returns control to block 260 of FIG. 2. From this point block 260 returns control to block 120 of FIG. 1.

Block 120 then examines the size of the compressed data (block 1160 of FIG. 11 (compressed using FIG. 9 method) and block 1190 of FIG. 11 (compressed using FIG. 14 method). In this case, block 120 of FIG. 1 determines that both blocks 1150 and 1180 of FIG. 11, each having 6 bytes of data, are within the target range of 6–11 bytes. As a result, block 120 of FIG. 1 transfers control to block 105.

In turn, block 105 of FIG. 1 recognizes block 1125 of FIG. 12 as a frame of raw data in need of compression. Consequently, block 110 calls the Compress Frame routine of FIG. 2.

The Compress Frame routine of FIG. 2 makes a series of tests on the data, illustrated by blocks 200, 210 and 230. The data of block 1125 of FIG. 12 is not the first frame of the movie and block 200 therefore transfers control to block 210. This example assumes that the application program calling the compression method of FIG. 1 did not specify to compress the data of block 1125 of FIG. 12 data of block 1125 as a key frame. Therefore, block 210 of FIG. 2 transfers control to block 230. Similarly, this example assumes that the application program calling the compression method of FIG. 1 did not specify to compress the movie using only intraframe compression and therefore block 230 of FIG. 2 transfers control to block 240. In turn, block 240 calls the Interframe Compression routine of FIGS. 3 and 4.

As discussed in the overview of the example, the Interframe Compression Routine of FIGS. 3 and 4 uses Intraframe and Interframe Tolerances of 250 and 2,000, respectively. The example uses an Intraframe Tolerance of 250 because this value worked well in compressing the data of block 1100 in FIG. 12. Similarly, the example uses an Interframe Tolerance of 2,000 because experimentation divulged that an effective Interframe Tolerance was generally eight times that of a successful Intraframe Tolerance.

Beginning with block 300 of FIG. 3, the routine determines that block 1125 of FIG. 12 is a line of uncompressed data and passes control to block 307 of FIG. 3. Block 307 sets the contents of the Previous Frame Pixel Pointer to point to pixel 1101 in block 1100 of FIG. 12. Similarly, block 310 of FIG. 3 sets the contents of the Current Frame Pixel Pointer to pixel 1126 in block 1125 of FIG. 12. Subsequently, block 320 of FIG. 3 initializes the delta offsets to zero.

The heart of the interframe compression process is the loop formed by blocks 330, 340, 350, 352, 354 and 356. This loop compares the color values of interframe pixel pairs until a pairs' Variance Value is greater than the Interframe Tolerance.

In this example, the looping begins when block 330 determines that pixels 1101 and 1126 of FIG. 12 form a valid interframe pixel pair. Subsequently, block 340 of FIG. 3 determines a Variance Value for these pixels in a manner identical to that of block 520 of FIG. 5, i.e., using the equation Variance Value=$(84-255)^2+(84-0)^2+(84-0)^2=43,353$. Since this value is greater than the Interframe Tolerance of 2,000, block 350 of FIG. 3 transfers control to block 360. In turn, block 360 determines that both delta offsets are equal to zero and passes control to block 407 of FIG. 4.

Once block 407 has control, it initializes the Length of Run variable to one and passes control to block 410. This example assumes that the application calling the compression method of FIG. 1 allows hybrid compression, i.e., mixing interframe and intraframe compression. In light of this assumption, block 410 of FIG. 4 transfers control to block 420.

Block 420 determines if (1) the number of non-compressed pixels left in the line plus the value of the Length of Run Variable is greater than the Run Length Minimum or (2) the number of non-compressed pixels left in the line equals zero. In this case, the number of non-compressed pixels left in the line, (10), plus the value of the Length of Run variable, (1), is greater than the Run Length Minimum, (4). As a result, block 420 transfers control to block 425 which calculates a Variance Value based on the color attributes of pixels 1126 and 1127 of FIG. 12 (the pixels referenced by (1) the contents of the Current Frame Pixel Pointer and (2) the contents of the Current Frame Pixel Pointer plus the Length of Run Variable).

In this case, the pixels' Variance Value is zero $[0=(84-84)^2+(84-84)^2+(84-84)^2]$. Because the Variance Value of zero is less than the Intraframe Tolerance of 250, block 430 of FIG. 4 transfers control to block 455. In turn, block 455 increments the Length of Run variable to two and returns control to block 420.

Block 420 determines that the number of non-compressed pixels left in the line, (8), plus the Length of Run variable, (2), is greater than the Run Length Minimum, (4), and, as a result, block 420 passes control to block 425. Block 425 calculates the Variance Value for pixels 1126 and 1128 of FIG. 12: Again, this value is zero $[0=(84-84)^2+(84-84)^2+(84-84)^2]$. As a result, block 430 of FIG. 4 passes control to block 455 which increments the Length of Run variable to three. Subsequently, block 455 passes control to block 420.

Again, block 420 determines that the number of non-compressed pixels left in the line, (7), plus the value of the Length of Run variable, (3), is greater than the Run Length Minimum, (4). Subsequently, block 420 passes control to block 425. In turn, block 425 calculates the Variance Value for pixels 1126 and 1129 of FIG. 12. The pixels calculated Variance Value is zero $[0=(255-255)^2+(0-0)^2+(0-0)^2]$. Because the pair's Variance Value is not greater than the Intraframe Tolerance, block 430 of FIG. 4 passes control to block 455. Consequently, block 455 increments the Length of Run variable to four. Subsequently, block 455 passes control to block 420.

Block 420 determines that the number of non-compressed pixels left in the line, (6), plus the value of the Length of Run variable, (4), is greater than the Run Length Minimum (4). As a result, block 420 passes control to block 425. In turn, block 425 calculates the Variance Value for pixels 1126 and 1130 of FIG. 12. Again, this value is zero $[0=(84-84)^2+(84-84)^2+(84-84)^2]$. Consequently, block 430 of FIG. 4 passes control to block 455 which increments the Length of Run variable to five. Subsequently, block 455 passes control to block 420.

Block 420 determines that the number of non-compressed pixels left in the line, (5), plus the Length of Run variable, (5), is greater than the Run Length Minimum (4), and, as a result, block 420 passes control to block 425. In turn, block 425 calculates the Variance Value for pixels 1126 and 1131 of FIG. 12. This time, however, the calculated Variance Value is 10,443 $[10,443=(143-84)^2+(143-84)^2+(143-84)^2]$. Since this value is much greater than the Intraframe Tolerance of 250, block 430 of FIG. 4 transfers control to block 435.

Block 435 examines the magnitude of the Length of Run variable. In this case, the value of the Length of Run variable, (5), is greater than the Run Length Minimum, (4). Consequently, block 435 transfers control to block 437. Block 437 encodes pixels 1126, 1127, 1128, 1129 and 1130 as a run length encoding.

As with the previously compressed data of block 1100 of FIG. 11, both the encoding method of FIG. 9 and the encoding method of FIG. 14 is illustrated in FIG. 12: Block 1210 of FIG. 12 uses the encoding method of FIG. 9, while blocks 1220 and 1230 use the encoding method of FIG. 14. Again, under normal circumstances, only one of the encoding methods would be used by an application.

The byte grouping 1211 inside block 1210 of FIG. 12 is the run length encoding of pixels 1126, 1127, 1128, 1129 and 1130 using the method of FIG. 9. The first byte, (05), of this grouping is the magnitude of the run length. The second byte, (41), of this grouping is the color index for pixels 1126, 1127, 1128, 1129 and 1130. See FIG. 10 (color lookup table illustrating 41 as the color index for RGB color values of (84, 84, 84)).

Similarly, the byte grouping 1221 inside block 1220 of FIG. 12 is the run length encoding of pixels 1126, 1127, 1128, 1129 and 1130 using the method of FIG. 14. The first byte of this grouping, 18, is proportional to the magnitude of the run length: The actual magnitude to the run length is obtained by subtracting 14 from the byte. Like the second byte of byte grouping 1211 of block 1210 in FIG. 12, the second byte of byte grouping 1221 of block 1220, 41, is the color index for pixels 1126, 1127, 1128, 1129 and 1130. See FIG. 10 (color lookup table illustrating 41 as the color index for RGB color values of (84, 84, 84).

Once block 437 of FIG. 4 encodes the run length, block 437 transfers control to block 428. Block 438 (1) sets the Length of Run variable to zero and (2) transfers control to block 440. Block 440 updates the contents of the Current Frame Pixel Pointer to point to the next pixel in block 1125 of FIG. 12 that needs to be examined, i.e., pixel 1131. Similarly, block 445 updates the contents of the Previous Frame Pixel Pointer to point to the corresponding pixel of block 1100 of FIG. 12, i.e., pixel 1106. Once block 445 of FIG. 4 updates the Previous Frame Pixel Pointer, block 445 transfers control to block 320 of FIG. 3.

Block 320 resets the delta offsets to zero and passes control to block 330. Block 330 recognizes pixels 1106 in block 1100 of FIG. 12 and 1131 in block 1125 of FIG. 12 as a valid interframe pixel pair. As a result, block 340 of FIG. 3 calculates the Variance Value of 1,875 for the pair $[1,875=(143-168)^2+(143-168)^2+(143-168)^2]$. Block 350 recognizes this value as being less than the Interframe Tolerance of 2,000, and passes control to block 352.

Block 352 updates the delta offsets, i.e., by incrementing the horizontal delta offset to one, and transfers control to block 354. Block 354 increments the contents of the Previous Frame Pixel Pointer and transfers control to block 356. In a similar manner, block 356 increments the contents of the Current Frame Pixel Pointer and transfers control to block 330.

Block 330 recognizes pixels 1107 in block 1100 of FIG. 12 and 1132 in block 1125 of FIG. 12 as a valid interframe pixel pair. As a result, block 340 of FIG. 3 calculates the Variance Value of 675 for the pair $[675=(153-168)^2+(153-168)^2+(153-168)^2]$. Block 350 recognizes this value as being less than the Interframe Tolerance of 2,000, and passes control to block 352.

Again, block 352 updates the delta offsets: This time by incrementing the horizontal delta offset to two. In turn, block 354 increments the contents of the Previous Frame Pixel Pointer and transfers control to block 356. In an equivalent manner, block 356 increments the contents of the Current Frame Pixel Pointer and transfers control to block 330.

Block 330 recognizes pixels 1108 in block 1100 of FIG. 12 and 1133 in block 1125 of FIG. 12 as a valid interframe pixel pair. As a result, block 340 of FIG. 3 calculates the Variance Value of 1,075 for the pair: $[1,075=(153-178)^2+(153-168)^2+(153-168)^2]$. Block 350 recognizes this value as being less than the Interframe Tolerance of 2,000, and passes control to block 352.

Block 352 updates the delta offsets, i.e., by incrementing the horizontal delta offset to three, and subsequently transfers control to block 354. Block 354 increments the contents of the Previous Frame Pixel Pointer and transfers control to block 356. In a similar manner, block 356 increments the contents of the Current Frame Pixel Pointer and transfers control to block 330.

Block 330 recognizes pixels 1109 in block 1100 of FIG. 12 and 1134 in block 1125 of FIG. 12 as a valid interframe pixel pair. As a result, block 340 of FIG. 3 calculates the Variance Value of 1,875 for the pair: $[1,475=(153-168)^2+(143-168)^2+(143-168)^2]$. Block 350 recognizes this value as being less than the Interframe Tolerance of 2,000, and passes control to block 352.

Block 352 updates the delta offsets, i.e., by incrementing the horizontal delta offset to four, and transfers control to block 354. Block 354 increments the contents of the Previous Frame Pixel Pointer and transfers control to block 356. In a similar manner, block 356 increments the contents of the Current Frame Pixel Pointer and transfers control to block 330.

Block 330 recognizes pixels 1110 in block 1100 of FIG. 12 and 1135 in block 1125 of FIG. 12 as a valid interframe pixel pair. As a result, block 340 of FIG. 3 calculates the Variance Value of 675 for the pair $[675=(153-168)^2+(153-168)^2+(153-168)^2]$. Block 350 recognizes this value as being less than the Interframe Tolerance of 2,000, and passes control to block 352.

Block 352 updates the delta offsets, i.e., by incrementing the horizontal delta offset to 5, and transfers control to block 354. Block 354 increments the contents of the Previous Frame Pixel Pointer and transfers control to block 356. In a similar manner, block 356 increments the contents of the Current Frame Pixel Pointer and transfers control to block 330.

Once block 330 has control, however, it recognizes that the Current Frame Pixel Pointer and the Previous Frame Pixel Pointer are pointing beyond the boundary of the raw video data (beyond blocks 1100 and 1125 of FIG. 12). As a result, block 330 of FIG. 3 transfers control to block 331.

Block 331 determines that the value of the horizontal delta, (5), is greater than the Delta Minimum, (4), and transfers control to block 332. Block 332 encodes the delta for pixels 1131, 1132, 1133, 1134 and 1135 of FIG. 12.

The delta encoding method of FIG. 9 is represented by byte grouping 1212 in block 1210 of FIG. 12. The first two bytes (00 and 02), of this grouping represent a delta escape sequence. The following byte, (05), is the magnitude of the horizontal delta offset. Similarly, the final byte, (00), is the magnitude of the vertical delta offset. Thus, the method of FIG. 9 requires four bytes to encode the delta.

The delta encoding method of FIG. 14, however, requires only a single byte. See byte grouping 1222 in block 1220 of FIG. 12. The sole byte, (05), of this grouping is the magnitude of the delta offset. As previously explained, the encoding method of FIG. 14 assumes that all single bytes, having values between one and fourteen, are horizontal deltas. In this manner, the encoding method of FIG. 14 routinely compresses data at a savings of 20% when compared to the method of FIG. 9.

After block 332 of FIG. 3 encodes the delta, block 332 encodes an end of bitmap escape code (byte grouping 1213 in block 1210 and byte grouping 1223 in block 1220). The end of bitmap encoding is straightforwardly explained by FIGS. 9 and 14.

At this point, block 300 of FIG. 3 recognizes that the invention has completely compressed frame n+1 (block 1220 of FIG. 12), relative to frame n of block (block 1100 of FIG. 12). As a result, block 305 of FIG. 3 returns control to block 260 of FIG. 2. In turn, block 260 returns control to block 120 of FIG. 1.

Block 120 examines the size of the compressed data relative to the target range of 6–11 bytes. The encoding method of FIG. 9 compressed the data to 8 bytes. See block 1210 of FIG. 12. In contrast, the encoding method of FIG. 14 compressed the data to 5 bytes. See block 1220 of FIG. 12. Consequently, the data encoded using the method of FIG. 9 is approximately in the middle of the target range of 6–11 bytes. On the other hand, the data encoded using the method of FIG. 14 is below the floor of the target range, i.e., 5 bytes is less than the floor of 6 bytes. As a result, block 120 takes two different courses of action depending on which encoding method was used.

Regarding the encoding method of FIG. 9, block 120 transfers control to block 105. Block 105 determines that the routine has compressed all the raw video data. As a result, block 105 transfers control to block 180. In turn, block 180 returns to the application which called the compression method of FIG. 1.

On the other hand, regarding the encoding method of FIG. 14, block 120 of FIG. 1 transfers control to block 130. Block 130 determines if the routine should split the frame. Since the invention compressed the frame below the floor of the target range, splitting the frame is not necessary and block 130 passes control to block 140.

In this example, block 140 decreases both tolerances by using the previously described modified binary search method. Thus, the new Interframe Tolerance is 1,000 and the new Intraframe Tolerance is 125. After adjusting the tolerances, block 140 transfers control to block 110. In turn, block 110 calls the Compress Frame routine of FIG. 2.

The Compress Frame routine of FIG. 2 makes a series of tests on the data, illustrated by blocks 200, 210, and 230. As previously described, each of these tests returns negative and the routine ultimately passes control to block 240 which calls the Interframe Compression routine of FIG. 3 and 4.

Beginning with block 300 of FIG. 3, the routine determines that block 1125 of FIG. 12 is a line of uncompressed data and passes control to block 307 of FIG. 3. Block 307 sets the contents of the Previous Frame Pixel Pointer to point to pixel 1101 in block 1100 of FIG. 12. Similarly, block 310 of FIG. 3 sets the contents of the Current Frame Pixel Pointer to point to pixel 1126 in block 1125 of FIG. 12. Subsequently, block 320 of FIG. 3 initializes the delta offsets to zero.

Next, block 330 determines that pixels 1101 and 1126 of FIG. 12 form a valid interframe pixel pair. Consequently, block 340 of FIG. 3 determines pixels' Variance Value. In this case, the pixels' Variance Value is 43,353 [43,353=(84−255)$^2$+(84−0)$^2$+(0−84)$^2$]. Since this value is greater than the new Interframe Tolerance of 1,000, block 350 of FIG. 3 transfers control to block 360. In turn, block 360 determines that both delta offsets are equal to zero and passes control to block 407 of FIG. 4.

Once block 407 has control, it initializes the Length of Run variable to one and passes control to block 410. As previously discussed, this example assumes that the application calling the compression method of FIG. 1 allows hybrid compression, i.e., mixing interframe and intraframe compression, so block 410 of FIG. 4 transfers control to block 420.

Block 420 determines if (1) the number of non-compressed pixels left in the line, plus the value of the Length of Run Variable, is greater than the Run Length Minimum or (2) the number of non-compressed pixels left in the line equals zero. In this case, the number of non-compressed pixels left in the line, (10), plus the value of the Length of Run variable, (1), is greater than the Run Length Minimum, (4). As a result, block 420 transfers control to block 425 which calculates a Variance Value based on the color attributes of pixels 1126 and 1127 of FIG. 12 (the pixels referenced by (1) the contents of the Current Frame Pixel Pointer and (2) the contents of the Current Frame Pixel Pointer plus the Length of Run Variable).

In this case, the pixels' Variance Value is zero [0=(84−84)$^2$+(84−84)$^2$+(84−84)$^2$]. Because the Variance Value of zero is less than the new Intraframe Tolerance of 125, block 430 of FIG. 4 transfers control to block 455. In turn, block 455 increments the Length of Run variable to two and returns control to block 420.

Block 420 determines that the number of non-compressed pixels left in the line, (8), plus the Length of Run variable, (2), is greater than the Run Length Minimum, (4), and, as a result, block 420 passes control to block 425. Block 425 calculates the Variance Value for pixels 1126 and 1128 of FIG. 12: Again, this value is zero: [0=(84−84)$^2$+(84−84)$^2$+(84−84)$^2$]. As a result, block 430 of FIG. 4 passes control to block 455 which increments the Length of Run variable to three. Subsequently, block 455 passes control to block 420.

Once more, block 420 determines that the number of non-compressed pixels left in the line, (7), plus the value of the Length of Run variable, (3), is greater than the Run Length Minimum, (4). Subsequently, block 420 passes control to block 425. Block 425 calculates the Variance Value for pixels 1126 and 1129 of FIG. 12. Once more the pixels' calculated Variance Value is zero [0 =(255−255)$^2$+(0−0)$^2$+(0−0)$^2$]. Because the pair's Variance Value is not greater than the new Intraframe Tolerance of 125, block 430 again passes control to block 455. In turn, block 455 increments the Length of Run variable to four. Subsequently, block 455 passes control to block 420.

Block 420 determines that the number of non-compressed pixels left in the line, (6), plus the value of the Length of Run variable, (4), is greater than the Run Length Minimum, (4). As a result, block 420 passes control to block 425. In turn, block 425 calculates the Variance Value for pixels 1126 and 1130 of FIG. 12. Again, this value is zero [0=(84−84)$^2$+(84−84)$^2$+(84−84)$^2$]. As a result, block 430 of FIG. 4 passes control to block 455 which increments the Length of Run variable to five. Subsequently, block 455 passes control to block 420.

Block 420 determines that the number of non-compressed pixels left in the line, (5), plus the Length of Run variable (5) is greater than the Run Length Minimum, (4), and, as a result, block 420 passes control to block 425. In turn, block 425 calculates the Variance Value for pixels 1126 and 1131 of FIG. 12. This time, however, the calculated Variance Value is 10,443 [10,443= (143−84)$^2$+(143−84)$^2$+(143−84)$^2$]. Since this value is much greater than the new Intraframe Tolerance of 125, block 430 of FIG. 4 transfers control to block 435.

Block 435 examines the magnitude of the Length of Run variable. In this case, the value of the Length of Run variable, (5), is greater than the Run Length Minimum (4). Consequently, block 435 transfers control to block 437. Block 437 encodes pixels 1126, 1127, 1128, 1129 and 1130 of FIG. 12 as a run length encoding.

The byte grouping 1231 in block 1230 is the run length encoding representation of pixels 1126, 1127, 1128, 1129 and 1130. (Block 1221 is encoded using the method of FIG. 14—the method of FIG. 9 was previously compressed within the target range and thus is no longer used). As previously described, the first byte, (18), of this grouping is proportional to the magnitude of the run length: the actual magnitude to the run length is obtained by subtracting 14 from the byte. The second byte, (41), of byte grouping 1221 of FIG. 12 is the color index for pixels 1126, 1127, 1128, 1129 and 1130. See FIG. 10 (color lookup table illustrating 41 as the color index for RGB color values of (84, 84, 84)).

Once block 437 of FIG. 4 encodes the run length, block 437 transfers control to block 428. Block 438 (1) sets the Length of Run variable to zero and (2) transfers control to block 440. Block 440 updates the contents of the Current Frame Pixel Pointer to point to the next pixel of block 1125 of FIG. 12 that needs to be compressed, i.e., pixel 1131. Similarly, block 445 of FIG. 4 updates the contents of the Previous Frame Pixel Pointer to point to the corresponding pixel of block 1100 of FIG. 12, i.e., pixel 1106. Subsequently, block 445 transfers control to block 320 of FIG. 3.

Block 320 resets the delta offsets to zero and passes control to block 330. Block 330 recognizes pixels 1106 in block 1100 of FIG. 12 and 1131 in block 1125 of FIG. 12 as a valid interframe pixel pair. As a result, block 340 calculates the Variance Value of 1,875 for the pair [$1{,}875=(143-168)^2+(143-168)^2+(143-168)^2$]. However, this Variance Value is now greater than the new Interframe Tolerance of 1,000. As a result, block 350 passes control to block 360.

In turn, block 360 determines that both delta offsets are equal to zero and passes control to block 407 of FIG. 4. Once block 407 has control, it initializes the Length of Run variable to one and passes control to block 410. As previously described, this example assumes that mixing interframe and intraframe compression is valid: thus, block 410 of FIG. 4 transfers control to block 420.

Block 420 determines that the number of non-compressed pixels left in the line, (5), plus the value of the Length of Run variable, (1), is greater than the Run Length Minimum, (4). As a result, block 420 transfers control to block 425 which calculates a Variance Value based on the color attributes of pixels 1131 and 1132 of FIG. 12 (the pixels referenced by (1) the contents of the Current Frame Pixel Pointer and (2) the contents of the Current Frame Pixel Pointer plus the Length of Run Variable).

In this case, the pixels' Variance Value is 300 [$300=(153-143)^2+(153-143)^2+(153-143)^2$]. Because the Variance Value of greater than the new Intraframe Tolerance of 125, block 430 of FIG. 4 transfers control to block 435. Block 435 determines that the magnitude of the Length of Run variable, (1), is less than the Run Length Minimum, (4), and transfers control to block 436. Block 436 encodes pixels 1131, 1132 and 1133 in absolute mode (as previously explained absolute mode encoding encrypts a minimum of three pixels).

The absolute encoding of these pixels, using the method of FIG. 14, is represented by the byte grouping 1232 in block 1230 of FIG. 12. The first two, (00 and 03), bytes of this grouping identify the following three bytes, 49, 50 and 50, as absolutely encoded pixels: (49) and (50) are color indexes for RGB values of (143, 143, 143) and (153, 153, 153), respectively. See FIG. 10 (color lookup table).

Once block 436 of FIG. 4 encodes pixels 1131, 1132 and 1133 of FIG. 11, block 436 of FIG. 4 passes control to block 438. Block 438 sets the Length of Run variable to zero and passes control block 440.

Block 440 updates the contents of the Current Frame Pixel Pointer to point to the next pixel of block 1125 of FIG. 12 that needs to be examined, i.e., pixel 1134. Similarly, block 445 of FIG. 4 updates the contents of the Previous Frame Pixel Pointer to point to the corresponding pixel of block 1100 of FIG. 12, i.e., pixel 1109. Once block 445 of FIG. 4 updates the Previous Frame Pixel Pointer, block 445 transfers control to block 320 of FIG. 3.

Block 320 resets the delta offsets to zero and passes control to block 330. Block 330 recognizes pixels 1109 in block 1100 of FIG. 12 and 1134 in block 1125 of FIG. 12 as a valid interframe pixel pair. As a result, block 340 in FIG. 3 calculates the Variance Value of 1,475 for the pair [$1{,}475=(153-168)^2+(143-168)^2+(143-168)^2$]. Again, however, this Variance Value is now greater than the new Interframe Tolerance of 1,000. As a result, block 350 passes control to block 360.

In turn, block 360 determines that both delta offsets are equal to zero and passes control to block 407 of FIG. 4. Once block 407 has control, it initializes the Length of Run variable to one and passes control to block 410. As previously described, this example assumes that mixing interframe and intraframe compression is valid: Thus, block 410 of FIG. 4 transfers control to block 420.

At this point, however, block 420 determines that the number of non-compressed pixels left in the line, (2), plus the value of the Length of Run variable, (1), is less than the Run Length Minimum, (4). As a result, block 420 transfers control to block 465.

Block 465 evaluates the magnitude of the Length of Run variable, and, upon determining that its value is one, block 465 transfers control to block 469. Block 469 encodes the pixels 1134 and 1135 in block 1125 of FIG. 12 by combining them with the absolutely encoded grouping 1232 of block 1230. The byte grouping of pixels 1133 and 1134 in combination with pixels 1131, 1132 and 1133 (the latter pixels previously encoded as byte grouping 1232 of block 1230) is represented by the byte grouping 1242 in block 1240 of FIG. 12.

The first two bytes, (00 and 05), of the grouping identify the following five bytes, (49, 50, 50, 49 and 50) as absolutely encoded pixels: (49) and (50) are color indexes for RGB values of (143, 143, 143) and (153, 153, 153), respectively. See FIG. 10 (color lookup table).

After block 469 of FIG. 4 creates the byte grouping of 1242 in block 1240 of FIG. 12, block 469 of FIG. 4 encodes an end of bitmap escape code (byte grouping 1243 in block 1240). The end of bitmap encoding is straightforwardly explained by FIG. 14.

Once block 469 of FIG. 4 has encoded this last byte grouping, the routine passes control to block 300 of FIG. 3. Because the compression of block 1125 of FIG. 12 is complete, block 300 of FIG. 3 passes control to block 305. Subsequently, block 305 returns control to block 260 of FIG. 2. From this point, block 260 returns control to block 120 of FIG. 1.

Block 120 examines the size of the compressed data relative (block 1240 of FIG. 12) to the target range of 6–11 bytes. On this pass, the encoding method of FIG. 14 was able to compress the data to 11 bytes: the ceiling of the target range. Thus, the encoding method of FIG. 14 compressed the data of block 1240 of FIG. 12 within the target range. Moreover, the encoding method of FIG. 14 encrypted considerably more detail than the encoding method of FIG. 9. Compare block 1210 of FIG. 12 with block 1240 of FIG. 12.

Because block 120 of FIG. 1 recognizes block 1240 of FIG. 12 as being within the target range, block 120 of FIG. 1 passes to block 105. Block 105 realizes that all the routine has compressed all the raw video data. As a result, block 105 transfers control to block 180. Block 180 returns to the application which called the compression method of FIG. 1. At this point, with both frames of data being compressed within the target range, the compression example is complete.

DECOMPRESSION EXAMPLE

Figure 13:
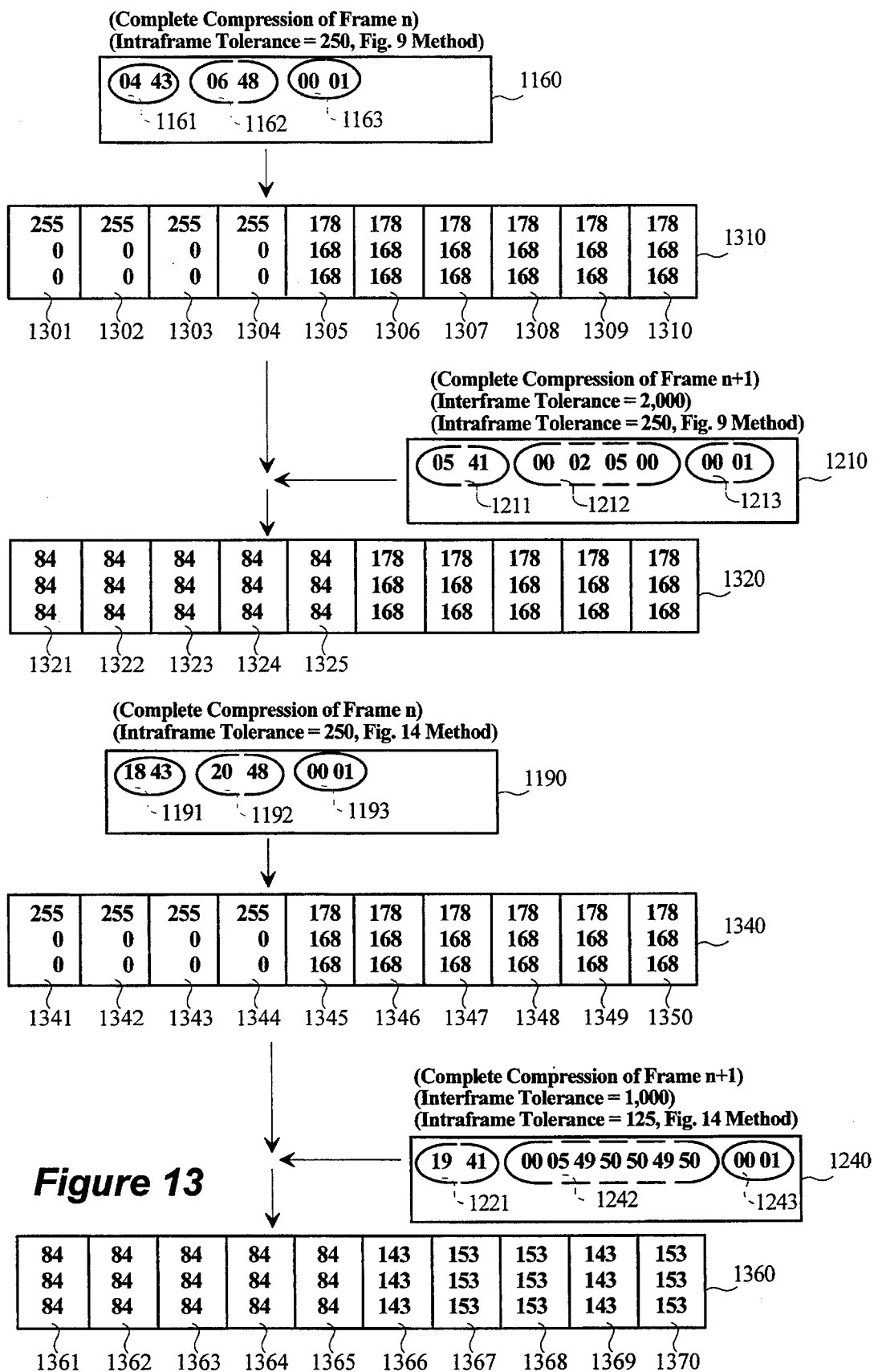
FIG. 13 illustrates the decompression of both intraframe compressed data and interframe compressed data using the Decompress Frame Routine of FIG. 8.

By way of example, the decompression processes for the frames of video data compressed in FIGS. 11 and 12 are represented in FIG. 13. The example will be described in detail below, however, the following overview of the example has been provided for the reader. First, the example will illustrate the decompression of the data encoded using the method of FIG. 9 (blocks 160, 1310, 1210 and 1320 of FIG. 13). Second, the example will illustrate the decompression of the data encoded using the method of FIG. 14 (blocks 1190, 1340, 1240 and 1360 of FIG. 13). For both of these methods, the decompression process tracks the Decompression Method routine of FIG. 9 and the Decompression Frame routine of FIG. 8. Moreover, as with the compression example, the decompression example continues to use the color table of FIG. 10. First, the example decompresses the compressed data of frame n. Second, once the data of frame n has been decompressed, the data of frame n+1 is decompressed and written directly on top of frame n in order to produce a decompressed version of frame n+1.

Regarding the decompression of the FIG. 9 encoded data, the process begins with the Decompression Method routine of FIG. 7. Starting with block 700, the routine accepts the compressed data of the video movie. Subsequently, block 710 determines that there are two frames in need of decompression and passes control to block 720. In turn, block 720 retrieves the first frame, block 1160 of FIG. 13. Subsequently, block 730 of FIG. 7 calls the Decompression Frame routine of FIG. 8.

Block 810 in FIG. 8 retrieves the first byte grouping from the compressed video data, i.e., byte grouping 1161 in block 1160 of FIG. 13. Once block 810 of FIG. 8 has retrieved this byte grouping, blocks 815, 820, 825, 830 and 880 conduct a series of tests on the data to determine the nature of byte grouping 1161 of FIG. 13.

In this case, block 830 of FIG. 8 recognizes byte grouping 1161 of FIG. 13 as a run length encoding. Subsequently, block 830 of FIG. 8 transfers control to block 855. Block 855, using the color lookup table of FIG. 10, determines that the run length's color index, (41), represents RGB values (255, 0, 0). Consequently, block 855 of FIG. 8 paints pixel 1301 in block 1310 of FIG. 13 (block 1310 represents the decompressed version of frame n).

Next, block 860 of FIG. 8 decrements the remaining magnitude of the run length, originally represented by the first byte of byte grouping 1161 in block 1160, before the routine passes control to block 865 of FIG. 8.

In this case, block 865 determines that block 860 decremented the remaining magnitude of the run length from four to three. As a result, block 865 transfers control back to block 855.

In this manner, the loop formed by blocks 855, 860 and 865, paints pixels 1301–1304 in block 1310 of FIG. 13. Once the loop formed by blocks 855, 860 and 865 of FIG. 8 has painted pixels 1301–1304 of FIG. 13, block 865 of FIG. 8 returns control to block 810.

In turn, block 810 retrieves the next byte grouping from the compressed video data, i.e., byte grouping 1162 in block 1160 of FIG. 13. Once again, block 830 of FIG. 8, recognizes this byte grouping as a run length encoding. As a result, the loop formed by blocks 855, 860 and 865 paints pixels 1305, 1305, 1307, 1308, 1309 and 1310 in block 1300 of FIG. 3. Once this loop has painted all these pixels, block 865 of FIG. 8 returns control to block 810.

Once more, block 810 retrieves the next byte grouping from the compressed video data, i.e., byte grouping 1163 in block 1160 of FIG. 13. In this case, block 815 of FIG. 8 recognizes byte grouping 1163 of FIG. 13 as an end of bitmap encoding and transfers control to block 840 of FIG. 8. As a result, block 840 returns control to block 740 of FIG. 7.

Block 740 examines the newly decompressed frame (block 1310 of FIG. 13) to determine if it is merely the top half of a split frame. In this case, block 1310 of FIG. 13 is not the top half of a split frame. As a result, block 740 of FIG. 7 transfers control to block 750. In turn, block 750 displays the frame, e.g., on a video monitor. Once block 750 has displayed the frame, it transfers control to block 710.

The decompression process continues when block 710 determines that frame n+1, i.e., block 1210 of FIG. 13, is in need of decompression. As a result, block 720 (1) retrieves block 1210 of FIG. 13 and (2) transfers control to block 730 of FIG. 7. Subsequently, block 730 calls the Decompress Frame routine of FIG. 8.

The routine of FIG. 8 decompresses block 1210 of FIG. 13 directly on top of block 1310 (frame n). In this manner, the routine produces block 1320 (frame n+1).

The actual decompression of frame n+1 begins when block 810 of FIG. 8 retrieves byte grouping 1211 from block 1210 of FIG. 13. In turn, block 830 of FIG. 8 recognizes byte grouping 1211 of FIG. 13 as a run length encoding having a magnitude of (5) and a color index of 41. Using the color table of FIG. 10, the routine determines that the color index of (41) describes RGB values of (84, 84, 84). Consequently, blocks 855, 860 and 865 of FIG. 8 paint the next available five pixels in block 1320, i.e., pixels 1321, 1322, 1323, 1324 and 1325. Once the loop has painted these pixels, block 865 of FIG. 8 returns control to block 810.

Subsequently, block 810 retrieves the next byte grouping from the compressed video data, i.e., byte grouping 1212 in block 1210 of FIG. 13. Consequently, block 825 of FIG. 8 recognizes byte grouping 1212 of FIG. 13 as a delta encoding. As a result, block 825 transfers control to block 850. Block 850 examines the magnitude of the horizontal and vertical delta offsets. In this case, the horizontal delta offset has a magnitude of five and the vertical delta offset has a magnitude of zero. As a result, the routine displaces the brush five pixels to the right in block 1300 of FIG. 13, i.e., to pixel 1310. Once block 845 of FIG. 8 has moved the brush, the routine transfers control back to block 810.

Once more, block 810 retrieves the next byte grouping from the compressed video data, i.e., byte grouping 1213 in block 1210 of FIG. 13. Block 815 of FIG. 8 interprets byte grouping 1213 of FIG. 13 as an end of bitmap encoding and transfers control to block 840 of FIG. 8. In turn, block 840 returns control back to block 740 of FIG. 7.

Block 740 determines that block 1320 of FIG. 13 is not merely the top half of a split frame and, consequently, transfers control to block 750. Block 750 displays block 1320 of FIG. 13 and transfers control to block 710 of FIG. 7. At this point, the routine, via block 710, discovers it has decompressed all the frames of the movie and transfers control to block 760. Block 760 returns to the application which called the decompression routine of FIG. 7. At this point, the encoded versions of frame n and frame n+1 using the method of FIG. 9 have been decompressed and displayed.

Next, this example will illustrate the decompression process for data encoded using the method of FIG. 14. Again, the process begins at block 700 of FIG. 7. Block 700 accepts the compressed movie data, i.e., blocks 1190 (frame n) and 1240 (frame n+1) of FIG. 13. Subsequently, block 710 determines that frame n is in need of decompression and transfers control to block 720. In turn, block 720 retrieves block 1190 of FIG. 13 and passes control to block 730 of FIG. 7. Block 730 calls the Decompressed Frame routine of FIG. 8.

The Decompress Frame routine begins its decompression in block 810. Block 810 retrieves byte grouping 1191 in block 1190 of FIG. 13. In turn, block 830 of FIG. 8 recognizes this by grouping as a run length encoding having a magnitude of (4) and a color index of (43) (magnitude of run length encoding obtained by subtracting 14 from the value of the first byte, i.e., 18−14=4). By referring to the color look-up table of FIG. 10, the loop formed by blocks 855, 860 and 865 paints pixels 1341, 1342, 1343 and 1344 in block 1340 of FIG. 14. Once this loop has painted these pixels, block 865 of FIG. 8 returns control to block 810.

In turn, block 810 retrieves the next byte grouping from the compressed video data, i.e., byte grouping 1192 in block 1190 of FIG. 13. Once more, block 830 recognizes this byte grouping as a run length encoding and passes control to block 855. Using the color look-up table of FIG. 10, block 855 of FIG. 8 colorizes the next available pixel in the decompressed version of frame n, i.e., pixel 1345 in block 1340 of FIG. 13. Subsequently, block 860 decrements the remaining magnitude of the run length, i.e., by decrementing the value of the first byte of the run length encoding. In turn, block 865 examines the remaining magnitude of the run length for a null value. In this fashion, the loop formed by blocks 855, 860 and 865 paint pixels 1345, 1346, 1347, 1348, 1349 and 1350 in block 1340 of FIG. 13. Once all these pixels have been painted, block 865 transfers control to block 810.

At this point, block 810 retrieves the next byte grouping from the compressed video data, i.e., byte grouping 1193 in block 1190 of FIG. 13. In this case, block 815 recognizes the byte grouping as an end of bitmap encoding and transfers control to block 840. In turn, block 840 returns control to block 740 of FIG. 7.

Block 740 determines that block 1340 of FIG. 13 is not the top half of the split frame and subsequently transfers control to block 750. Block 750 (1) displays the frame and (2) transfers control back to block 710.

At this point, block 710 determines that the routine has not decompressed frame n+1 (block 1240 of FIG. 13). As a result, block 710 of FIG. 7 transfers control to block 720. In turn, block 720 (1) retrieves block 1240 of FIG. 13 (frame n+1) and (2) transfers control to block 730 of FIG. 7. Subsequently, block 730 calls the Decompress Frame routine of FIG. 8.

The decompression of frame n+1 begins when block 810 retrieves byte grouping 1221 in block 1240 of FIG. 13. Subsequently, block 830 of FIG. 8 recognizes this byte grouping as a run length encoding having a magnitude of (5) and a color index of (41). Referring to the color look-up table of FIG. 10, block 855 of FIG. 8 recognizes this index as representing the RGB values (84, 84, 84). As a result, blocks 855, 860 and 865 of FIG. 8 paint pixels 1361, 1362, 1363, 1364 and 1365 in block 1350 in FIG. 13. Once this loop has painted these pixels, block 865 of FIG. 8 returns control to block 810.

At this point, block 810 retrieves the next byte grouping from the compressed video data, i.e., byte grouping 1242 in block 1240 of FIG. 13. In turn, block 880 recognizes this byte grouping as an absolute mode encoding and transfers control to block 885. Block 885 retrieves the color index of the first absolutely encoded pixel, i.e., 49. From this point, block 885 uses the color index table of FIG. 10 to determine the RGB values of the pixel, i.e., (143, 143, 143). Subsequently, block 885 of FIG. 8 colorizes the next available pixel, i.e., pixel 1366 in block 1360 of FIG. 13.

Next, block 890 decrements the remaining number of absolutely encoded pixels to be painted. In this case, block 890 accomplishes this task by decrementing the second byte in byte grouping 1242 of FIG. 13. (The second byte, 05, represents the number of absolutely encoded pixels. See FIG. 14. Once block 890 of FIG. 8 decrements this byte, the routine transfers control to 895. In turn, block 895 examines the remaining value of the second byte to determine if the loop formed by blocks 885, 890 and 895 have painted all the absolutely encoded pixels. In this manner, the loop paints pixels 1366, 1367, 1368, 1369 and 1370 in block 1360 of FIG. 13. Subsequently, block 895 returns control to block 810.

At this point, block 810 retrieves the next byte grouping from the compressed video data, i.e., byte grouping 1243 in block 1240 of FIG. 13. Block 815 of FIG. 8 recognizes this byte-grouping as an end of bitmap encoding and transfers control to block 840. In turn, block 840 returns control to block 740 of FIG. 7.

Block 740 determines that block 1360 of FIG. 13 was not the top half of a split frame and transfers control to block 750. Subsequently, block 750 displays the frame and transfers control back to block 710. At this point, block 710 recognizes that the routine has decompressed all the frames of the movie. As a result, block 710 transfers control to block 760. Block 760 returns to application program which called the decompression method.

At this point, the method has decompressed the data representing frames n and n+1, compressed using the method of FIG. 14. The advantageous nature of the encoding method of FIG. 14 is illustrated by the enhanced detail of block 1360 of FIG. 13 (frame n+1 compressed and decompressed using the method of FIG. 14) relative to block 1320 of FIG. 13 (frame n+1 compressed and decompressed using the method of FIG. 9).

We claim:

1. A method for compressing video data, the video data being formed by a plurality of pixels, the method including the computer-implemented steps:

(a) forming a plurality of pixel groupings;

(b) determining a characteristic value for each pixel grouping;

(c) specifying a tolerance;

(d) determining a variance between the characteristic values of the pixel groupings;

(e) when the determined variance is within the tolerance, specifying a specified characteristic value to represent the pixel groupings, setting the characteristic value of each pixel grouping to the specified characteristic value; and (f) counting a number of consecutive pixel groupings having the same specified characteristic value and storing the counted number and the specified characteristic value in a compressed version of the video data.

2. The method of claim wherein the characteristic value is a color value.

3. The method of claim 1 wherein the characteristic value is a gray scale value.

4. The method of claim 1 wherein the characteristic value is an intensity value.

5. The method of claim 1 wherein each of the pixel groupings is formed by a single pixel.

6. The method of claim 1 wherein the characteristic value is formed by a plurality of components and wherein the step of determining the variance includes the steps:

squaring the differences of at least one of the components; and summing the squared differences.

7. The method of claim 1, including the steps:

specifying a target range for the compressed version of the video data; and iteratively adjusting the tolerance until the compressed version of the video data is within the target range.

8. The method of claim 7 wherein the computer-implemented step of iteratively adjusting the tolerance includes iteratively performing the steps:

determining the size of the compressed version of the video data; and when the determined size is not within the target range, adjusting the tolerance and repeating steps (e)–(f) using the adjusted tolerance.

9. The method of claim 8 wherein the computer-implemented step of adjusting the tolerance includes:

identifying a range of permissible tolerances;

selecting a new tolerance value from the identified tolerance range; and redefining the range of permissible tolerances as having a limit equal the newly selected tolerance.

10. The method of claim 9 wherein the new tolerance is selected from an approximate midpoint of the identified tolerance range.

11. The method of claim 9 wherein the step of selecting the new tolerance includes:

adding a predetermined value to one of the previously used tolerances.

12. The method of claim 11 wherein the predetermined value is increased with each iterative adjustment of the tolerance.

13. A method for mapping a video, the video being formed by a plurality of raw video frames, the frames being formed by a plurality of pixels, the method including the computer-implemented steps:

(a) forming a plurality of pixel groupings from the pixels of each raw data frame;

(b) determining a characteristic value for each pixel grouping;

(c) specifying a tolerance;

(d) determining a variance between the characteristic values of the pixel groupings; and (e) when the determined variance is within the tolerance, specifying a specified characteristic value to represent the pixel groupings, and setting the characteristic value of each pixel grouping to the specified characteristic value.

14. The method of claim 13 wherein the characteristic value is a color value.

15. The method of claim 13 wherein the characteristic value is a gray scale value.

16. The method of claim 13 wherein the characteristic value is an intensity value.

17. The method of claim 13 wherein each of the pixel groupings is formed by a single pixel.

18. The method of claim 13 wherein the characteristic value is formed by a plurality of components and wherein the step of determining the variance includes the steps:

squaring the differences of at least one of the components; and summing the squared differences.

19. The method of claim 13, including the computer-implemented steps:

(f) specifying a range of tolerances;

(g) specifying a range of acceptable resolution for the mapped video;

(h) determining the resolution of the mapped video; and (i) when the determined resolution is not within the range of acceptable resolution, selecting a new tolerance value from the specified range of tolerances, redefining the range of tolerances as having an end-limit equal to the selected new tolerance; and (j) iteratively repeating steps (e), (h) and (i) until the mapped video is within the range of acceptable resolution.

20. The method of claim 19 wherein the new tolerance is selected from an approximate midpoint of the range of tolerances.

21. The method of claim 19 wherein the new tolerance is selected by adding a predetermined value to one of the previously used tolerances.

22. The method of claim 21 wherein the predetermined value is increased with each iterative adjustment of the tolerance.

23. A method for compressing a video, the video being formed by a plurality of raw data video frames, the frames being formed by a plurality of pixels, the method including the computer-implemented steps:

(a) forming a plurality of pixel groupings from the pixels of each raw data video frame;

(b) determining a characteristic value for each pixel grouping;

(c) specifying a tolerance;

(d) determining a variance between the characteristic values of the pixel groupings;

(e) when the determined variance is within the tolerance, specifying a specified characteristic value to represent the pixel groupings, and setting the characteristic value of each pixel grouping to the specified characteristic value; and (f) counting a number of consecutive pixel groupings having the same specified characteristic value and storing the counted number and the specified characteristic value in a compressed data video frame.

24. The method of claim 23 wherein the characteristic value is a color value.

25. The method of claim 23 wherein the characteristic value is a gray scale value.

26. The method of claim 23 wherein the characteristic value is an intensity value.

27. The method of claim 23 wherein the pixel groupings are formed by a single pixel.

28. The method of claim 23 wherein the characteristic value is formed by a plurality of components and wherein the step of determining the variance includes the steps:

squaring the differences of at least one of the components; and summing the squared differences.

29. The method of claim 23, including the steps:

specifying a target range for the compressed data video frame; and iteratively adjusting the tolerance until the compressed data video frame is within the target range.

30. The method of claim 29 wherein the computer-implemented step of iteratively adjusting the tolerance includes iteratively performing the computer-implemented steps:

determining a size of the compressed data video frame; and when the determined size is not within the target range, adjusting the tolerance and repeating steps (e)–(f) using the adjusted tolerance.

31. The method of claim 29 wherein the computer-implemented step of iteratively adjusting the tolerance includes the computer-implemented steps:

identifying a previously determined effective tolerance;

repeating steps (e)–(f) using the effective tolerance and determining the size of the compressed data video frame;

when the determined size using the effective tolerance is not within the target range, specifying a maximum tolerance, repeating steps (e)–(f) using the maximum tolerance and determining the size of the compressed data video frame; and when the determined size using the maximum tolerance is within the target range, specifying a heuristically determined tolerance, repeating steps (e)–(f) using the heuristically determined tolerance and determining the size of the compressed data video frame.

32. The method of claim 29, including the computer-implemented steps:

specifying a maximum value;

when the tolerance is greater than the maximum value, splitting the raw data video frame into a plurality of raw data portions; and repeating steps (a)–(f) using each raw data portion as a raw data video frame.

33. The method of claim 32, including the computer-implemented step of:

substituting one of the raw data portions for one of the raw data frames following the split raw data video frame.

34. A method for compressing a video, the video being formed by a plurality of raw data video frames, the frames being formed by a plurality of pixels, the method including the computer-implemented steps:

(a) forming a plurality of pixel groupings from the pixels of each raw data video frame;

(b) determining a characteristic value for each pixel grouping;

(c) specifying an interframe tolerance;

(d) for a plurality of corresponding interframe pixel groupings, determining an interframe variance between the characteristic values of the interframe pixel groupings;

(e) counting a number of consecutive interframe pixel groupings whose determined interframe variance is within the interframe tolerance; and (f) encoding a delta indicative of the counted number of consecutive interframe pixel groupings in a compressed data video frame.

35. The method of claim 34 wherein the characteristic value is a color value.

36. The method of claim 34 wherein the characteristic value is a gray scale value.

37. The method of claim 34 wherein the characteristic value is an intensity value.

38. The method of claim 34 wherein each of the pixel groupings is formed by a single pixel.

39. The method of claim 34 wherein the characteristic value is formed by a plurality of components and wherein the step of determining the variance includes the steps:

squaring the differences of at least one of the components; and summing the squared differences.

40. The method of claim 34 wherein the computer-implemented step of encoding the delta includes the computer-implemented steps:

selecting a range of acceptable delta values; and when the counted number of consecutive interframe pixel groupings is within the range of acceptable delta values, encoding the delta as the counted number.

41. The method of claim 40, including the computer-implemented steps:

when the counted number of consecutive interframe pixel groupings is not within the range of acceptable delta values, encoding the delta using an escape sequence, the counted number and additional positioning information.

42. The method of claim 34, including the steps:

when the determined interframe variance is not within than the interframe tolerance, specifying an intraframe tolerance and for a plurality of intraframe pixel groupings, determining an intraframe variance between the characteristic values of the intraframe pixel groupings;

when the determined intraframe variance is within the intraframe tolerance, specifying a specified characteristic value to represent each intraframe pixel grouping, and setting the characteristic value of each intraframe pixel grouping to the specified characteristic value; and counting a number of consecutive intraframe groupings having the same specified characteristic value.

43. The method of claim 42, including the computer-implemented steps:

selecting a range of acceptable delta values;

when the counted number of consecutive interframe pixel groupings is within the range of acceptable delta values, encoding the delta as the counted number;

when the counted number of consecutive interframe pixel groupings is not within the range of acceptable delta values, encoding the delta using an escape sequence, the counted number and additional positioning information;

specifying an offset value outside of the range of delta values;

combining the offset value and the counted number; and storing the combined value and the specified characteristic value in the compressed data video frame.

44. The method of claim 42 including the step:

storing the counted number and the specified characteristic value in the compressed data video frame.

45. The method of claim 42, including the computer-implemented steps:

specifying a target range for the compressed data video frame;

determining a size of the compressed data video frame; and when the determined size is not within the target range, adjusting the interframe tolerance and repeating steps (e)–(f) using the adjusted interframe tolerance.

46. The method of claim 42, including the computer-implemented steps:

specifying a maximum value; and when the intraframe tolerance is greater than the maximum value, splitting the raw data frame into a plurality of raw data portions and repeating steps (a)–(f) using each raw data portion as a raw data video frame.

47. The method of claim 42, including the computer-implemented steps:

specifying a maximum value; and when the interframe tolerance is greater than the maximum value, splitting the raw data video frame into a plurality of raw data portions and repeating steps (a)–(f) using each raw data portion as a raw data video frame.

48. The method of claim 42, including the computer-implemented steps:

specifying a target range for the compressed data video frame;

determining a size of the compressed data video frame; and when the determined size is not within the target range, adjusting at least one of the interframe or intraframe tolerances and repeating steps (e)–(f) using the adjusted tolerance.

49. The method of claim 42, including the computer-implemented steps:

specifying a target range for the compressed data video frame;

determining a size of the compressed data video frame;

when the determined size is not within the target range, adjusting at least one of the tolerances and repeating steps (e)–(f) using the adjusted tolerance;

specifying a maximum value; and when the interframe tolerance is greater than the maximum value, splitting the raw data video frame into a plurality of raw data portions and repeating steps (a)–(f) using each of the raw data portions as a raw data frame.

50. The method of claim 42, including the computer-implemented steps:

designating one of the raw data video frames as a key frame; and for a plurality of intraframe pixel groupings of the key frame, determining a variance between the characteristic values between the intraframe pixel groupings, when the determined variance is within the intraframe tolerance, specifying a characteristic value to represent the intraframe pixel grouping, setting the characteristic value of each intraframe pixel grouping to the specified characteristic value, counting a number of consecutive intraframe pixel groupings having the same specified characteristic value, and storing the counted number and the specified characteristic value in the compressed data video frame.

51. The method of claim 42, including the computer-implemented steps:

specifying a target range for the compressed data video frame;

determining a size of the compressed data video frame;

when the determined size is not within the target range, adjusting at least one of the tolerances and repeating steps (e)–(f) using the adjusted tolerance;

specifying a maximum value; and when the intraframe tolerance is greater than the maximum value, splitting the raw data video frame into a plurality of raw data portions and repeating steps (a)–(f) using each of the raw data portions as a raw data frame.

52. The method of claim 51, including the steps:

counting a number of consecutive intraframe pixel groupings having the same characteristic value; and storing the counted number and the specified characteristic value in the compressed data video frame.

53. The method of claim 42 wherein the step of adjusting the interframe tolerance includes:

specifying a range of interframe tolerances;

selecting a new interframe tolerance value from the specified range of interframe tolerances; and redefining the range of interframe tolerances as having a limit equal the newly selected interframe tolerance.

54. The method of claim 53 wherein the new interframe tolerance is selected from an approximate midpoint of the range of interframe tolerances.

55. The method of claim 53 wherein the step of selecting the new interframe tolerance includes:

adding a predetermined value to one of the previously used interframe tolerances.

56. The method of claim 55 wherein the predetermined value is increased with each iteration.

57. A method for compressing a video, the video being formed by a plurality of raw data video frames, the frames being formed by a plurality of pixels, the method including the computer-implemented steps:

(a) forming a plurality of pixel groupings from the pixels of each raw data frame;

(b) determining a characteristic value for each pixel grouping;

(c) specifying an interframe tolerance;

(d) determining an interframe variance between the characteristic values of a plurality of corresponding interframe pixel groupings;

(e) when the determined interframe variance is not within the interframe tolerance, creating an intraframe compressed frame by forming a plurality of intraframe pixel groupings from one of the raw data frames, specifying an intraframe tolerance, determining an intraframe variance between the characteristic values of the intraframe pixel groupings, when the determined intraframe variance is within the intraframe tolerance, specifying a specified characteristic value to represent the intraframe pixel grouping, setting the characteristic value of each intraframe pixel grouping to the specified in characteristic intraframe value, counting a number of consecutive intraframe pixel groupings having the same specified characteristic intraframe value and storing the counted number and the specified characteristic value in a compressed data video frame;

(f) when the determined interframe variance is within the interframe tolerance, creating an interframe compressed frame by counting a number of consecutive interframe pixel groupings, encoding a delta indicative of the counted number of consecutive interframe pixel groupings in a compressed data video frame by selecting a range of acceptable delta values, and when the counted number of consecutive interframe pixel groupings is within the range acceptable delta of values, encoding the delta as the counted number, else when the counted number of consecutive interframe pixel groupings is not within the range of values, encoding the delta using an escape sequence, the counted number and additional positioning information;

(g) specifying a periodic key frame interval;

(h) designating a raw data frame as a key frame at the conclusion of the periodic key frame interval;

(i) for a plurality of intraframe pixel groupings of the key frame, specifying a key frame intraframe tolerance, determining a key frame intraframe variance between the characteristic values between the key frame intraframe pixel groupings, when the determined key frame variance is within the key frame tolerance, specifying a key frame characteristic value to represent the key frame pixel grouping, setting the key frame characteristic value of each key frame pixel grouping to the specified key frame characteristic value, counting a number of consecutive key frame pixel groupings having the same specified key frame characteristic value, storing the counted number and the specified key frame characteristic value in the compressed data video frame;

(j) specifying a target range for the compressed data video frame;

(k) determining a size of each compressed data video frame;

(l) when the determined size is not within the target range, specifying a minimum acceptable resolution level for the compressed data video frame;

(m) when the compressed data video frame is within the acceptable resolution level, adjusting at least one of the tolerances, and repeating steps (e)–(f) using the adjusted tolerance; and (n) when the compressed data video frame is not within the acceptable resolution level, splitting the raw data frame into a plurality of raw data portions and repeating steps (a)–(f) using each raw data portion as a raw data frame.

58. A method for encoding a quantum of data formed by a plurality of data units, including the computer-implemented steps:

selecting a range of acceptable delta values;

determining the number of data units; and when the determined number of data units is within the range of delta values, encoding a delta as the determined number of data units, wherein the delta is indicative of positioning information for a location in the quantum of data.

59. The method of claim 58, including the computer-implemented steps:

when the determined number of data units is not within the range of delta values, encoding the delta using an escape sequence, the counted number and additional positioning information.

60. The method of claim 58, including the step:

encoding a number of consecutive similar data units as a run length, wherein the run length has a magnitude value and an associated characteristic value.

61. The method of claim 60 wherein the step of encoding the run length includes the steps:

specifying an offset value;

counting the number of consecutive similar data units;

combining the offset value and the counted value; and encoding the magnitude of the run length using the combined value.

62. The method of claim 60 wherein the step of encoding the run length includes the steps:

counting the number of consecutive similar data units; and encoding the magnitude of the run length using the counted value.

63. A method for encoding a delta, wherein the delta is indicative of a number data units in a second data grouping that are similar to identically positioned data units in a first data grouping, including the computer-implemented steps:

selecting a range of acceptable delta values;

determining the number of consecutive data units; and when the determined number of consecutive data units is within the range of delta values, encoding the delta as the determined number of consecutive data units.

64. The method of claim 63, including the computer-implemented steps:

when the determined number of consecutive data units is not within the range of delta values, encoding the delta using an escape sequence, the counted number and additional positioning information.

65. The method of claim 63, including the step:

encoding a number of consecutive similar data units as a run length, wherein the run length has a magnitude value and an associated characteristic value.

66. The method of claim 65 wherein the step of encoding the run length includes the steps:

specifying an offset value;

counting the number of consecutive similar data units;

combining the offset value and the counted value; and encoding the magnitude of the run length using the combined value.

67. The method of claim 65 wherein the step of encoding the run length includes the steps:

counting the number of consecutive similar data units; and encoding the magnitude of the run length using the counted value.

68. A method for encoding data, the method including the computer-implemented steps of:

determining a directional offset;

encrypting a delta as a single value, the value representing a magnitude of the directional offset, the delta having a maximum delta value;

adding the maximum delta value to a length of run value to define a first run length value;

encoding the first run length value;

determining a characteristic value to define a second run length value; and encoding the second run length value.

69. A method for creating a decompressed version of video data from a plurality of compressed data groupings, the compressed data groupings formed by a plurality of run length data groupings, each run length data grouping formed by a characteristic value and a proportional magnitude value, and a plurality of deltas, each delta having a maximum possible delta value, the method including the computer-implemented steps:

retrieving a compressed data grouping;

when the compressed data grouping is a run length representation, determining the characteristic value of the representation, determining a run length value of the representation by subtracting the maximum possible delta value from the proportional magnitude value, and, for a number equal to the run length value, writing the characteristic value in a number of data locations of the decompressed version of the video data; and when the compressed data grouping is a delta unit, determining a value of the delta unit and moving a positioning pointer a number of data units equal to the value of the delta unit.

70. A method for creating a decompressed version of video data from a compressed version of video data, the method including the computer-implemented steps:

retrieving a compressed data grouping from the compressed version of video data;

identifying a range of acceptable delta values;

determining a magnitude of the compressed data grouping; and when the magnitude of the compressed data grouping is within the range of acceptable delta values, moving a portioning pointer a number of data units equal to the magnitude of the compressed delta grouping.

71. In a computer system, an apparatus for compressing video data to a range of target sizes, wherein the video data is formed by a plurality of pixels, the apparatus comprising:

means for determining a variance between a first and a second pixel by comparing a characteristic value for the first pixel with a characteristic value for the second pixel, the first and the second pixel being from among the plurality of pixels that form the video data;

means for specifying a single characteristic value for the first and the second pixel when the determined variance is within a provided tolerance; and means for storing the single characteristic value in a compressed version of the video data, wherein the stored single characteristic value represents the characteristic value for the first pixel and the characteristic value for the second pixel.

72. The apparatus of claim 71, further comprising:

means for iteratively adjusting the provided tolerance until the compressed version of the video data is within the range of target sizes.

73. In a computer system, an apparatus for compressing a video, the video having at least two frames wherein each frame is formed by a plurality of pixels, and wherein each pixel has a characteristic value, the apparatus comprising:

means for determining a number of consecutive pixels of a first frame that, relative to similarly positioned pixels of a second frame, have characteristic values that are within a specified tolerance; and means for storing the determined number in a compressed version of the second frame, the stored determined number indicating a number of consecutive pixels of the second frame that do not have to be altered when decompressing the compressed version of the second frame.

74. The apparatus of claim 73, further comprising:

means for specifying a target range for the compressed version of the second frame;

means for adjusting the specified tolerance when the compressed version of the second frame is not within the specified target range;

means for discerning a number of consecutive pixels of the first frame that, relative to the similarly positioned pixels of the second frame, have characteristic values that are within the adjusted tolerance; and means for updating the compressed version of the second frame by storing the discerned number in the compressed version of the second frame, the stored discerned number indicating a number of consecutive pixels of the second frame that do not have to be altered when decompressing the compressed version of the second frame.

* * * * *

UNITED STATES PATENT AND TRADEMARK OFFICE
CERTIFICATE OF CORRECTION

PATENT NO. : 5,467,134
DATED : November 14, 1995
INVENTOR(S) : Laney et al.

It is certified that error appears in the above-indentified patent and that said Letters Patent is hereby corrected as shown below:

In column 34, claim 2, line 62, after "claim" and before "wherein", please insert --1--.

In column 38, claim 42, line 26, please delete "than".

In column 40, claim 57, line 52, please delete "in".

In column 40, claim 57, line 65, please delete "acceptable delta of" and insert therefor --of acceptable delta--.

In column 42, claim 63, line 8, after "number" and before "data", please insert --of--.

Signed and Sealed this

Second Day of April, 1996

Attest:

BRUCE LEHMAN

Attesting Officer

Commissioner of Patents and Trademarks